United States Patent [19]

Kobayashi et al.

[11] Patent Number: 5,244,970

[45] Date of Patent: Sep. 14, 1993

[54] MODIFIED POLYOLEFIN-CONTAINING THERMOPLASTIC RESIN COMPOSITION

[75] Inventors: Akira Kobayashi; Kouichi Yokoyama; Tatsuo Teraya; Yuji Fujita; Shigeyuki Toki; Katsuyuki Yokomizo; Eiji Kuchiki; Tetsuya Kawamura, all of Saitama, Japan

[73] Assignee: Tonen Corporation, Tokyo, Japan

[21] Appl. No.: 706,703

[22] Filed: May 29, 1991

[30] Foreign Application Priority Data

May 29, 1990 [JP] Japan .................. 2-139280
Jun. 29, 1990 [JP] Japan .................. 2-172882
Jun. 29, 1990 [JP] Japan .................. 2-172883
Oct. 29, 1990 [JP] Japan .................. 2-291088

[51] Int. Cl.$^5$ .............................. C08G 68/48
[52] U.S. Cl. ........................ 525/63; 525/64; 525/66; 525/65; 525/69
[58] Field of Search .............. 525/63, 64, 66, 69, 525/65

[56] References Cited

U.S. PATENT DOCUMENTS 4,172,859 10/1979 Epstein .................. 428/402
4,174,358 11/1979 Epstein .................. 525/183

FOREIGN PATENT DOCUMENTS

| | | |
|---|---|---|
| 0180302 | 7/1986 | European Pat. Off. . |
| 51-144452 | 5/1976 | Japan . |
| 5847419 | 3/1977 | Japan . |
| 54-123158 | 9/1979 | Japan . |
| 55-44108 | 11/1980 | Japan . |
| 56-55450 | 5/1981 | Japan . |
| 58-42639 | 3/1983 | Japan . |
| 59-232135 | 12/1984 | Japan . |
| 60-49018 | 3/1985 | Japan . |
| 60-58447 | 4/1985 | Japan . |
| 60-118735 | 6/1985 | Japan . |
| 60-130580 | 7/1985 | Japan . |
| 60-215052 | 10/1985 | Japan . |
| 60-219254 | 11/1985 | Japan . |
| 60-219257 | 11/1985 | Japan . |
| 61-60744 | 3/1986 | Japan . |
| 61-60746 | 3/1986 | Japan . |
| 64-75547 | 3/1989 | Japan . |
| 64-87645 | 3/1989 | Japan . |
| 1-174550 | 7/1989 | Japan . |
| 1-193351 | 8/1989 | Japan . |
| 1-236266 | 9/1989 | Japan . |

OTHER PUBLICATIONS

Patent Abstracts of Japan vol. 13, No. 21 (C-560) (3369) Jan. 18, 1989 and JP-A-63 225 619 (Kanegafuchi) Sep. 20, 1988.

*Primary Examiner*—Paul R. Michl
*Assistant Examiner*—Edward Cain
*Attorney, Agent, or Firm*—Armstrong, Westerman, Hattori, McLeland & Naughton

[57] ABSTRACT

A thermoplastic resin composition comprising (a) modified polyolefin produced by graft-polymerizing a polyolefin with a glycidyl compound represented by the following general formula:

$$(CH_2=C-C-NH-CH_2)_n Ar$$
$$\phantom{(CH_2=}\,R\phantom{-}O$$

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and (b) a matrix polymer resin such as polyamide, polyester, polycarbonate etc.

28 Claims, No Drawings

MODIFIED POLYOLEFIN-CONTAINING THERMOPLASTIC RESIN COMPOSITION

BACKGROUND OF THE INVENTION

The present invention relates to a thermoplastic resin composition containing a modified polyolefin and having excellent mechanical properties such as impact resistance, etc. It also relates to a thermoplastic resin composition reinforced with inorganic fillers and having improved impact resistance, heat resistance, etc. without suffering from discoloration. It further relates to a method of producing a modified polyolefin-containing composition and a method of producing a modified polyolefin-containing graft copolymer.

Recently, engineering plastics such as polyamide resins, polyesters, polycarbonates, etc. have been finding various applications. Specifically, polyamide resins are light and have excellent heat resistance, chemical resistance, workability, mechanical strength, etc. However, the polyamide resins are poor in mechanical properties such as impact resistance, etc., and have a large water absorption property. Polyesters such as polyethylene terephthalate, polybutylene terephthalate, etc. have excellent heat resistance, mechanical strength, etc. However, the polyesters are poor in mechanical properties such as impact resistance, etc. Polycarbonates also have excellent mechanical properties, particularly in impact resistance. However, when molded articles made of polycarbonates become larger, their impact resistance drastically decreases.

Apart from them, polypropylene has excellent mechanical strength, moldability, chemical resistance, etc., but it is poor in secondary formability, adhesiveness, paintability, etc., because it is a non-polar material. On the other hand, polystyrene resins have good adhesiveness. Particularly, styrene-acrylonitrile copolymers show good chemical resistance, mechanical strength and heat resistance. Accordingly, it is expected to obtain a combination of good properties of the polystyrene resins and polypropylene by blending them. However, since the polystyrene resins have a poor compatibility with polypropylene, the resulting blends show poor surface peel resistance and impact resistance.

In view of the above, various proposals have been made to provide blends of these resins with modified polyolefins for the purpose of improving their mechanical and physical properties.

With respect to compositions of polyamides and modified polyolefins, Japanese Patent Publication No. 55-44108 discloses a reinforced thermoplastic resin composition consisting essentially of 60-99 weight % of a polyamide resin matrix phase having a number-average molecular weight of at least 5,000; and 1-40 weight % of another phase having a particle size of 0.01-1.0 μm and consisting of a particular branched or linear polymer bonded to the polyamide resin matrix, the particular branched or linear polymer being a modified polyolefin or a modified olefinic elastomer, which may contain other unsaturated monomers. However, since the modified polyolefin or olefinic elastomer is modified with unsaturated carboxylic acids, etc., and since such modified polyolefin or olefinic elastomer shows a relatively poor compatibility with the polyamide resin, sufficiently high impact strength cannot be achieved.

Japanese Patent Laid-Open No. 60-219257 discloses a thermoplastic resin composition comprising (A) 99.5-60 weight % of a polyamide resin and (B) 0.5-40 weight % of an ethylenic copolymer, the ethylenic copolymer (B) being a terpolymer consisting of (a) 55-94 weight % of ethylene, (b) 5-40 weight % of a particular alkoxy alkyl acrylate and (c) 0.5-1.5 weight % of maleic anhydride, or a terpolymer consisting of (a) 55-94 weight % of ethylene, (b) 5-40 weight % of a particular alkoxy alkyl acrylate and (d) 0.5-1.5 weight % of glycidyl methacrylate and/or glycidyl acrylate. However, since the ethylenic copolymer shows a relatively poor compatibility with the polyamide resin, sufficiently high impact strength cannot be achieved.

Japanese Patent Laid-Open No. 54-123158 discloses a polyolefin resin composition comprising a modified polyolefin grafted with unsaturated carboxylic acids (optionally diluted with polyolefin), a polyamide resin and a filler. Japanese Patent Laid-Open No. 59-232135 discloses a polyolefin resin composition comprising a modified polyolefin grafted with unsaturated carboxylic acids, a polyamide resin and a crystalline polyolefin. Japanese Patent Laid-Open No. 60-118735 discloses a polyolefin resin composition obtained by melt-blending 10-99 parts by weight of a polyamide resin and 90-1 parts by weight of a modified polyolefin containing 0.01-5.0 weight % of an unsaturated carboxylic acid. However, these unsaturated carboxylic acid-modified polyolefins have a poor compatibility with the polyamide resins.

Japanese Patent Laid-Open No. 60-49018 discloses a polyamide-polyolefin resin composition obtained by melt-blending 10-100 parts by weight of a polyamide resin, 3-100 parts by weight of a polyolefin, 0.001-5.0 parts by weight of an unsaturated carboxylic acid or its derivatives, and 0.01-2.0 parts by weight of a peroxide, per 100 parts by weight of the total amount of the polyamide resin and the polyolefin. In this case too, a sufficiently high compatibility cannot be achieved.

With respect to compositions of polyesters and modified polyolefins, Japanese Patent Publication No. 58-47419 discloses a resin composition produced by melt-blending 100 parts by weight of a saturated polyester constituted by a dicarboxylic acid component containing 40 mol % of a terephthalic acid and a diol component and having an intrinsic viscosity of 0.5-3.0 with 1-150 parts by weight of a copolymer comprising 70-99.5 weight % of an α-olefin; 0.5-20 weight % of a glycidyl methacrylate and 0.1-30 weight % of vinyl acetate.

Japanese Patent Laid-Open No. 60-58447 discloses a thermoplastic resin composition comprising polypropylene (A), a thermoplastic polyester (B), a modified propylene-α-olefin random copolymer (C), a styrene-butadiene block copolymer hydrate (D), and an inorganic filler (E), the modified propylene-α-olefin random copolymer (C) being produced by grafting (G) a propylene-α-olefin random copolymer having a crystallization degree determined by X-ray of 0-30 weight % and a propylene content of 50-70 mol %, with 0.01-5 weight % of a graft monomer selected from unsaturated carboxylic acids and their derivatives, the amount of each component, per 100 parts by weight of the total amount of (A)+(B), being 1-80 parts by weight of (C), 1-50 parts by weight of (D), and 5-150 parts by weight of (E).

Japanese Patent Laid-Open No. 60-219254 discloses a thermoplastic resin composition comprising (A) 99.5-60 weight % of a saturated polyester and (B) 0.5-40 weight % of an ethylenic copolymer, the ethylenic copolymer (B) being a terpolymer consisting of (a) 55-94 weight % of ethylene, (b) 5-40 weight % of a particular alkoxy alkyl acrylate and (c) 0.5-1.5 weight % of maleic anhydride, or a terpolymer consisting of (a) 55-94 weight % of ethylene, (b) 5-40 weight % of a particular alkoxy alkyl acrylate and (d) 0.5-1.5 weight % of glycidyl methacrylate and/or glycidyl acrylate.

Japanese Patent Laid-Open No. 1-193351 discloses an aromatic polyester composition comprising 100 parts by weight of a particular aromatic polyester capable of forming an anisotropical molten phase and 0.1-60 parts by weight of an olefinic polymer comprising an α-olefin and a glycidyl ester of an α, β-unsaturated acid.

Japanese Patent Laid-Open No. 1-236266 discloses a thermoplastic polyester resin composition comprising (A) 100 parts by weight of a thermoplastic polyester resin; (B) 1-100 parts by weight of a polymer or copolymer consisting of one or more of a vinyl cyanide compound, an acrylate, a methacrylate, an aromatic vinyl compound, etc.; (C) 0.5-80 parts by weight of an olefinic copolymer comprising an α-olefin and a glycidyl ester of an α,β-unsaturated acid or a graft copolymer formed by grafting the above olefinic copolymer with a monomer selected from a vinyl cyanide compound, an acrylate, a methacrylate, an aromatic vinyl compound, etc.

Japanese Patent Laid-Open No. 51-144452 discloses a resin composition comprising 60-99 weight % of a matrix resin consisting essentially of a polyester matrix resin and/or a polycarbonate matrix resin; and 1-40 weight % of a modified ethylenic copolymer grafted with an α,β-ethylenic unsaturated carboxylic acid or its derivative.

In the above polyester compositions, however, the modified polyolefins are also poor in compatibility with the polyesters.

In addition, as compatibilizers for polyesters and polypropylenes, various proposals have been made to add epoxy group-containing copolymers to the thermoplastic resin compositions comprising polypropylenes and polyesters.

Japanese Patent Laid-Open No. 61-60744 discloses a thermoplastic resin composition comprising 100 parts by weight of a resin composition comprising (A) 10-90 weight % of polypropylene, (B) 90-10 weight % of a saturated polyester resin, and (C) 2-30 parts by weight of an epoxy group-containing copolymer.

Japanese Patent Laid-Open No. 61-60746 discloses a thermoplastic resin composition comprising 100 parts by weight of a resin composition comprising (A) 50-90 weight % of a modified polypropylene with or without polypropylene, (B) 50-10 weight % of a saturated polyester resin, and (C) 2-30 parts by weight of an epoxy group-containing copolymer.

However, in these thermoplastic polyester compositions, a sufficient improvement in flexural modulus and impact resistance cannot be achieved. Also, the polypropylene and the polyester are not sufficiently compatible with each other even in the presence of the above modified polyolefins.

With respect to compositions of polycarbonates and modified polyolefins, Japanese Patent Laid-Open No. 60-215052 discloses a thermoplastic resin composition comprising (A) 99.5-60 weight % of a polycarbonate resin, and (B) 0.5-40 weight % of an ethylenic copolymer, the ethylenic copolymer (B) being a terpolymer consisting of (a) 55-94 weight % of ethylene, (b) 5-40 weight % of a particular alkoxy alkyl acrylate and (c) 0.5-1.5 weight % of maleic anhydride, or a terpolymer consisting of (a) 55-94 weight % of ethylene, (b) 5-40 weight % of a particular alkoxy alkyl acrylate and (d) 0.5-1.5 weight % of glycidyl methacrylate and/or glycidyl acrylate.

Japanese Patent Laid-Open No. 64-75547 discloses a thermoplastic resin composition comprising (a) 95-5 weight % of an aromatic polycarbonate, (b) 5-95 weight % of a polyolefin, and (c) 2-100 parts by weight of a modified polyolefin and 2-100 parts by weight of a polybutylene terephthalate per 100 parts by weight of the total amount of the aromatic polycarbonate and the polyolefin. The modified polyolefin is a random, block or graft copolymer of olefin and an unsaturated carboxylic acid.

In these polycarbonate resin compositions, however, the modified polyolefins modified with unsaturated carboxylic acids or their derivatives have a poor compatibility with the polycarbonates.

With respect to polyolefin-based compositions, Japanese Patent Laid-Open Nos. 64-87645 and 1-174550 disclose compositions of polypropylene, polystyrene resins, and compatibilizers such as styrene-unconjugated diene block copolymers, etc. However, such compabilizers are ineffective particularly when styrene-acrylonitrile copolymers are used as the polystyrene resins.

With respect to the blending of polypropylene with inorganic fillers such as glass fibers, Japanese Patent Laid-Open No. 56-55450 discloses a polyolefin composition comprising (a) a modified polyolefin grafted with an unsaturated carboxylic acid or its anhydride or a mixture of such a modified polyolefin with an unmodified polyolefin, (b) an inorganic filler such as glass fibers, talc, mica, etc., and (c) a nucleating agent or a nucleating agent + a thermal deterioration-preventing agent.

Japanese Patent Laid-Open No. 58-42639 discloses a polyolefin composition comprising (a) a modified polyolefin grafted with an unsaturated carboxylic acid or its anhydride or a mixture of such a modified polyolefin with an unmodified polyolefin, (b) glass fibers, and (c) calcium silicate fibers.

However, since these compositions containing modified polyolefins grafted with unsaturated carboxylic acids or their derivatives are discolored to a yellowish color, their applications are restricted in many cases. In addition, since the modified polyolefins grafted with unsaturated carboxylic acids or their derivatives are likely to be decomposed in the process of graft polymerization, they fail to have sufficiently large molecular weights.

OBJECT AND SUMMARY OF THE INVENTION

Accordingly, an object of the present invention is to provide a thermoplastic resin composition comprising a matrix polymer resin and a modified polyolefin well compatible with each other, thereby showing excellent mechanical properties, such as impact resistance, etc.

Another object of the present invention is to provide a thermoplastic resin composition further having excellent heat resistance, surface gloss and low water adsorption.

A further object of the present invention is to provide a thermoplastic resin composition containing a modified polyolefin and an inorganic filler, thereby showing excellent mechanical properties such as rigidity, impact resistance and heat resistance.

A further object of the present invention is to provide a method of producing a modified polyolefin-polyester graft copolymer comprising a modified polyolefin and a polyester at a high graft ratio without suffering from the formation of gels.

As a result of intense research in view of the above object, the inventors have found that a good compatibility can be achieved between a matrix polymer resin and a modified polyolefin produced by modifying a polyolefin with a particular glycidyl compound containing an acrylamide group and an epoxy group, and that a composition obtained therefrom shows remarkably improved mechanical properties, particularly impact resistance. Also, the inventors have found that by adding the above modified polyolefin to a composition of polypropylene and an inorganic filler, the resulting reinforced composition shows remarkably improved impact strength, rigidity, heat resistance, etc. The inventors have further found that by graft-polymerizing such modified polyolefin to the polyester, a high graft ratio can be achieved without forming gels. The present invention has been completed based on these findings.

Thus, the thermoplastic resin composition according to the first embodiment of the present invention comprises:
(a) 2-70 weight % of a modified olefinic elastomer produced by graft-polymerizing:
  (i) 100 parts by weight of an olefinic elastomer comprising 5-95 weight % of ethylene and 95-5 weight % of an α-olefin other than ethylene; with
  (ii) 0.01-30 parts by weight of a glycidyl compound represented by the following general formula:

$$(CH_2=C-C-NH-CH_2)_n Ar$$
$$\phantom{(CH_2=}R\phantom{-}O$$

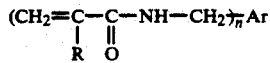

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(b) 30-98 weight % of a polyamide resin.

The thermoplastic resin composition according to the second embodiment of the present invention comprises:
(a) 2-70 weight % of a modified olefinic elastomer produced by graft-polymerizing:
  (i) 100 parts by weight of an olefinic elastomer comprising 5-95 weight % of ethylene and 95-5 weight % of an α-olefin other than ethylene; with
  (ii) 0.01-30 parts by weight of a glycidyl compound represented by the following general formula:

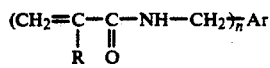

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(b) 30-98 weight % of a polyester.

The thermoplastic resin composition according to the third embodiment of the present invention comprises:
(a) 2-70 weight % of a modified olefinic elastomer produced by graft-polymerizing:
  (i) 100 parts by weight of an olefinic elastomer comprising 5-95 weight % of ethylene and 95-5 weight % of an α-olefin other than ethylene; with
  (ii) 0.01-30 parts by weight of a glycidyl compound represented by the following general formula:

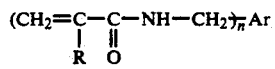

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(b) 30-98 weight % of a polycarbonate.

The thermoplastic resin composition according to the fourth embodiment of the present invention comprises:
(a) 5-95 weight % of a modified polypropylene produced by graft-polymerizing:
  (i) 100 parts by weight of polypropylene; with
  (ii) 0.01-30 parts by weight of a glycidyl compound represented by the following general formula:

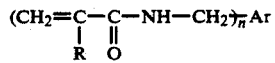

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(b) 95-5 weight % of a polyamide resin.

The thermoplastic resin composition according to the fifth embodiment of the present invention comprises:
(a) polypropylene;
(b) a modified polypropylene produced by graft-polymerizing:
  (i) 100 parts by weight of polypropylene; with
  (ii) 0.01-30 parts by weight of a glycidyl compound represented by the following general formula:

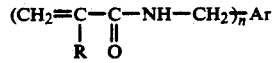

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(c) a polyamide resin,
the amount of (b) being 5 weight % or more based on the total amount of (a)+(b); and the total amount of (a)+(b) being 5-95 weight % based on the total amount of (a)+(b)+(c).

The thermoplastic resin composition according to the sixth embodiment of the present invention comprises:
(a) 5-95 weight % of a modified polypropylene produced by graft-polymerizing:
  (i) 100 parts by weight of polypropylene; with
  (ii) 0.01-30 parts by weight of a glycidyl compound represented by the following general formula:

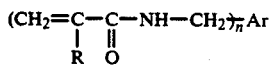

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(b) 95-5 weight % of a polyester.

The thermoplastic resin composition according to the seventh embodiment of the present invention comprises:
(a) polypropylene;
(b) a modified polypropylene produced by graft-polymerizing:
  (i) 100 parts by weight of polypropylene; with
  (ii) 0.01-30 parts by weight of a glycidyl compound represented by the following general formula:

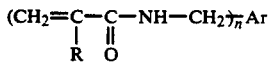

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(c) a polyester,
the amount of (b) being 5 weight % or more based on the total amount of of (a)+(b); and the total amount of (a)+(b) being 5-95 weight % based on the total amount of (a)+(b)+(c).

The thermoplastic resin composition according to the eighth embodiment of the present invention comprises:
[A] 100 parts by weight of a mixture of:
(a) 5-95 weight % of a modified polypropylene mix comprising:
  (1) 5 weight % or more of a modified polypropylene produced by graft-polymerizing:
    (i) 100 parts by weight of polypropylene; with
    (ii) 0.01-30 parts by weight of a glycidyl compound represented by the following general formula:

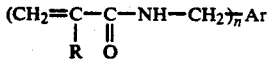

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(2) a remaining amount of polypropylene; and
(b) 95-5 weight % of a styrene-acrylonitrile copolymer; and
[B] 2-100 parts by weight of polycaprolactone.

The thermoplastic resin composition according to the ninth embodiment of the present invention comprises:
[A] 100 parts by weight of a modified polypropylene mix comprising:
(1) 2 weight % or more of a modified polypropylene produced by graft-polymerizing:
  (i) 100 parts by weight of polypropylene; with
  (ii) 0.01-30 parts by weight of a glycidyl compound represented by the following general formula:

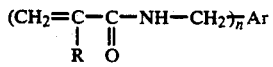

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(2) a remaining amount of polypropylene; and
[B] 5-70 parts by weight of glass fibers.

The thermoplastic resin composition according to the tenth embodiment of the present invention comprises:
[A] 50-98 weight % of a modified polyolefin mix comprising:
(1) 2 weight % or more of a modified polyolefin produced by graft-polymerizing:
  (i) 100 parts by weight of a polyolefin; with
  (ii) 0.01-30 parts by weight of a glycidyl compound represented by the following general formula:

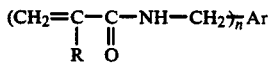

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(2) a remaining amount of polyolefin; and
[B] 2-50 weight % of talc.

The thermoplastic resin composition according to the eleventh embodiment of the present invention comprises:
[A] 50-98 weight % of a modified polyolefin mix comprising:
(1) 2 weight % or more of a modified polyolefin produced by graft-polymerizing:
  (i) 100 parts by weight of a polyolefin; with
  (ii) 0.01-30 parts by weight of a glycidyl compound represented by the following general formula:

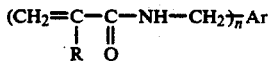

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(2) a remaining amount of polyolefin; and
[B] 2-50 weight % of mica.

The method of producing a modified polypropylene-polyester graft copolymer according to the twelfth embodiment of the present invention comprises the step of melt-blending:
(a) 90-10 parts by weight of a modified polypropylene produced by graft-polymerizing polypropylene with 0.01-20 weight % of a glycidyl compound represented by the following general formula:

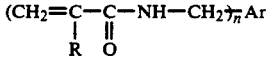

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; with (b) 10-90 parts by weight of a polyester.

The method of producing a modified polypropylene-polyester graft copolymer according to the thirteenth embodiment of the present invention comprises the step of melt-blending:
(a) 100 parts by weight of polypropylene;
(b) 0.1-15 parts by weight of a glycidyl compound represented by the following general formula:

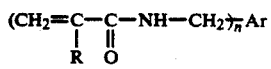

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(c) 5-70 parts by weight of glass fibers,
thereby causing the modification of said polypropylene with said glycidyl group.

DETAILED DESCRIPTION OF THE INVENTION

[1] Polyolefins
[A] Polypropylene

The polypropylene which can be used in the present invention is not restricted to homopolymers of propylene, and block or random copolymers consisting of 50 mol % or more, preferably 80 mol % or more, of propylene and remaining amounts of other α-olefins may also be used.

Particularly, a propylene random copolymer containing an unconjugated diene comonomer(hereinafter referred to as "PPDM") is preferable. This unconjugated diene comonomer is represented by the following general formula:

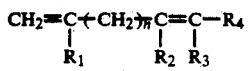

wherein each of $R_1$-$R_4$ is a hydrogen atom or an alkyl group having 1-6 carbon atoms, and n is an integer of 1-20.

The unconjugated dienes usable in PPDM include, for instance, 2-methyl-1,4-pentadiene, 1,4-hexadiene, 4methylidene-1-hexene, 4-methyl-1,4-hexadiene, 5-methyl-1,4-hexadiene, 1,4-heptadiene, 4-ethyl-1,4-hexadiene, 4,5-dimethyl-1,4-hexadiene, 4-methyl-1,4-heptadiene, 4-ethyl-1,4-heptadiene, 5-methyl-1,4-heptadiene, 5-methyl-1,4-octadiene, 1,5-heptadiene, 1,5-octadiene, 5-methyl-1,5-heptadiene, 6-methyl-1,5-heptadiene, 2-methyl-1,5-hexadiene, 1,6-octadiene, 6-methyl-1,6-octadiene, 7-methyl-1,6-octadiene, 2-methyl-1,6-heptadiene, 1,9-decadiene, 1,13-tetradecadiene, etc. Among them, 1,4-hexadiene, 2-methyl-1,5-hexadiene, 7-methyl-1,6-octadiene, 1,9-decadiene, 1,13-tetradecadiene, etc. are particularly preferable. These unconjugated dienes may be used in combination.

In the random copolymerization of propylene with the unconjugated diene, a usual polymerization method using a Ziegler-Natta catalyst can be employed. In this case, the percentage of the unconjugated diene may be 0.05-10 mol %, based on the total weight of propylene and the unconjugated diene. When it is less than 0.05 mol %, a high graft ratio cannot be achieved in the production of the propylene random copolymer. On the other hand, when it exceeds 10 mol %, the resulting propylene random copolymer shows a drastically decreased crystallization degree. The preferred amount of the unconjugated diene in the propylene random copolymer is 0.1-3 mol %.

The propylene random copolymer may further contain up to 5 mol % of other unsaturated monomers such as ethylene, butene-1, etc. The weight-average molecular weight of the propylene random copolymer is usually 100,000-1,000,000.

As described above, it should be noted that the term "polypropylene" used herein is not restricted to a homopolymer, and that the above copolymers may also be included.

[B] Polyethylene

The polyethylene which can be used in the present invention is not restricted to homopolymers of ethylene, and copolymers of ethylene and up to 20 mol % of an α-olefin having 4-20 carbon atoms may be used. The polyethylene has a melt index (MI, 190° C., 2.16 kg load) of 0.01-100 g/10 minutes, and a density (ASTM D1505) of 0.90-0.98 g/cm$^3$. Specific examples of such polyethylene include low-density polyethylene, linear low-density polyethylene, high-density polyethylene, ultra-high-molecular weight polyethylene, etc.

[C] Olefinic Elastomers

The olefinic elastomers usable in the present invention are copolymer rubbers comprising ethylene and one or more α-olefins other than ethylene, such as propylene, 1-butene, 1-hexene, 4-methyl-1-pentene, etc. Typical examples of the copolymer rubbers comprising ethylene and one or more α-olefins other than ethylene include an ethylene-propylene copolymer rubber (EPR), an ethylene-butene copolymer rubber (EBR), an ethylene-propylene-diene copolymer rubber (EPDM), etc. The dienes in the ethylene-propylene-diene copolymer rubber (EPDM) include unconjugated dienes such as dicyclopentadiene, 1,4-hexadiene, cyclooctadiene, methylene norbornene, etc. and conjugated dienes such as butadiene, isoprene, etc.

The olefinic elastomer has an ethylene content of 5-95 weight %, preferably 10-90 weight %. When the ethylene content is less than 5 weight % or more than 95 weight %, it does not show sufficient elastomeric properties. The crystallization degree of the olefinic elastomer is usually 40 weight % or less.

The ethylene-propylene copolymer rubber (EPR) used in the present invention preferably comprises 50-80 mol % of ethylene, and 20-50 mol % of propylene. The more preferred range is 60-70 mol % for the ethylene and 30-40 mol % for the propylene.

The EPR has a melt flow rate (MFR, 230° C., 2.16 kg load) of 0.01-50 g/10 minutes preferably 0.5-30 g/10 minutes.

The ethylene-butene copolymer rubber (EBR) used in the present invention preferably comprises 50-90 mol % of ethylene, and 10-50 mol % of butene. The more preferred range is 60-80 mol % for the ethylene and 20-40 mol % for the butene.

The EBR has a melt flow rate (MFR, 230° C., 2.16 kg load) of 0.01-50 g/10 minutes preferably 0.5-30 g/10 minutes.

The ethylene-propylene-diene copolymer rubber (EPDM) used in the present invention preferably comprises 40-70 mol % of ethylene, 30-60 mol % of propylene, and 1-10 mol % of a diene. The more preferred range is 50-60 mol % for the ethylene, 40-50 mol % for the propylene, and 3-6 mol % for the diene.

The EPDM has a melt flow rate (MFR, 230° C., 2.16 kg load) of 0.01-50 g/10 minutes preferably 0.1-30 g/10 minutes.

The ethylene-propylene copolymer rubber (EPR), the ethylene-butene copolymer rubber (EBR) and the ethylene-propylene-diene copolymer (EPDM) may further contain other α-olefins such as 4-methyl-1-pentene, etc. in an amount of 10 mol % or less. Other monomers which may be contained are vinyl acetate, acrylate, etc.

Incidentally, the olefinic elastomers may contain 80 weight % or less of crystalline polyolefins such as homopolymers of α-olefins such as ethylene, propylene, butene-1, hexene-1, 4-methyl-1-pentene, etc.; non-elastomeric copolymers of ethylene and propylene or other α-olefins; non-elastomeric copolymers made of two or more of these α-olefins; blends of the above homopolymers and/or copolymers, etc.

In a case where the crystalline polyolefin is added, its amount is 80 weight % or less, preferably 50 weight % or less, based on the total amount (100 weight %) of the olefinic elastomer and the crystalline polyolefin. When the amount of the crystalline polyolefin exceeds 80 weight %, the elastomeric properties disappear.

[2] Graft Monomers

The graft monomer usable in the present invention is a glycidyl compound represented by the following general formula (1):

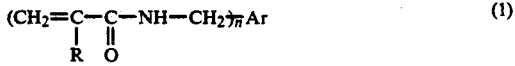

wherein R is a hydrogen atom or an alkyl group having 1-6 carbon atoms, Ar is an aromatic hydrocarbon group having 6-20 carbon atoms and containing at least one glycidyloxy group, and n is an integer of 1-4.

One of the preferred glycidyl compounds may be represented by the following formula (2):

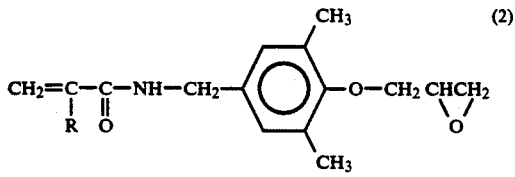

wherein R is a hydrogen atom or an alkyl group having 1-6 carbon atoms.

Such a glycidyl compound may be produced by a method disclosed, for instance, in Japanese Patent Laid-Open No. 60-130580.

In this method, a condensation reaction takes place between an aromatic hydrocarbon containing at least one phenolic hydroxyl group, and either one of N-methylol acrylamide, N-methylol methacrylamide and an alkyl ether derivative of N-methylol methacrylamide (these acrylamides may be summarily called "N-methylol acrylamides") in the presence of an acidic catalyst, so that a compound represented by the following general formula (3) is produced:

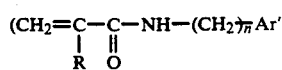

wherein R is a hydrogen atom or an alkyl group having 1-6 carbon atoms, Ar' is an aromatic hydrocarbon group having 6-20 carbon atoms and containing at least one hydroxyl group, and n is an integer of 1-4.

The above aromatic hydrocarbons having at least one phenolic hydroxyl group are not particularly restricted, and their examples include phenolic compounds such as phenol, o-cresol, m-cresol, p-cresol, 2,6-xylenol, 2,4-xylenol, o-chlorophenol, m-chlorophenol, p-chlorophenol, o-phenylphenol, 2,6-diphenylphenol, etc.; polyphenolic compounds such as hydroquinone, catechol, phloroglucinol, etc.; polycyclic hydroxy compounds such as 1-naphthol, 2-naphthol, 9-hydroxy anthracene, etc.; bis phenols such as 2,2-bis (4-hydroxyphenyl) propane (bisphenol-A), bis (4-hydroxyphenyl) methane, etc.

By substituting the hydroxyl group in the compound represented by the general formula (3) with a glycidyl group, the glycidyl compound represented by the general formula (1) may be obtained.

This substitution reaction with the glycidyl group takes place in two steps: First, an addition reaction of the compound represented by the general formula (3) with an epihalohydrin is carried out, and a hydrogen halide-removing reaction is subsequently carried out by using a caustic alkali.

The addition reaction of the compound (3) with an epihalohydrin is usually carried out by using a phase-transfer catalyst.

The epihalohydrins used herein include epichlorohydrin, epibromohydrin, epiiodohydrin, etc.

The phase-transfer catalysts which may be used in the present invention include, for instance, quaternary ammonium salts such as tetrabutyl ammonium bromide, trioctyl methyl ammonium chloride, benzyl triethyl ammonium chloride, etc.; quaternary phosphonium salts such as tetraphenyl phosphonium chloride, triphenyl methyl phosphonium chloride, etc.

The amount of the phase-transfer catalyst is preferably 0.01-100 mol %, based on 100 mol % of the compound represented by the general formula (3). The particularly preferred amount of the phase-transfer catalyst is 0.05-10 mol %. The reaction conditions (time and temperature) of the above addition reaction are 50°-120° C. for 5 minutes to 2 hours, more preferably 80°-110° C. for 10-30 minutes.

The reaction is followed by a hydrogen halide-removing reaction by using a caustic alkali.

The caustic alkalis include sodium hydroxide, potassium hydroxide, lithium hydroxide, etc. They may be used in the form of a solid or an aqueous solution. The catalysts used for removing a hydrogen halide may be the same as those of the phase-transfer catalysts, and other catalysts than the above phase-transfer catalysts include crown ethers, ethylene glycol, diethylene glycol, triethylene glycol, tetraethylene glycol, polyethylene glycol, etc.

The caustic alkali used in the above reaction is preferably in an amount (by mol) equal to or larger than that of the compound represented by the general formula (3), more preferably 1.1-1.5 times by mol that of the compound represented by the general formula (3). The reaction conditions (time and temperature) of the hydrogen halide-removing reaction are 20°-90° C. for 10 minutes to 3 hours, preferably 40°-70° C. for 30 minutes to 2 hours.

[3] Modified Polyolefins

[A] Modified Polypropylene

The modified polypropylene is produced by graft-polymerizing the polypropylene with the above described glycidyl compound. This graft polymerization may be carried out by a melt-blending method or a solution method. In the case of the melt-blending method, polypropylene, a glycidyl compound (graft monomer), and if necessary, a catalyst are introduced into an extruder, a double-screw kneader, etc., and the resulting mixture is subjected to melt blending at a temperature of 180°-300° C., preferably 220°-260° C., for 0.1-20 minutes. In the case of a solution method, the above starting materials are dissolved in an organic solvent such as xylene, etc., and the solution is stirred while heating at a temperature of 90°-200° C. for 0.1-100 hours. In both cases, usual radical polymerization catalysts may be used for the graft polymerization, and peroxides such as benzoyl peroxide, lauroyl peroxide, di-tert-butyl peroxide, acetyl peroxide, tert-butyl perbenzoate, dicumyl peroxide, perbenzoic acid, peracetic acid, tert-butyl perpivalate, 2,5-dimethyl-2,5-di-(tert-butyl peroxy) hexyne, etc., diazo compounds such as azobisisobutyronitrile, etc. are preferable. The amount of the graft polymerization catalyst is 0.1-10 parts by weight per 100 parts by weight of the glycidyl compound graft monomer. Incidentally, in the present invention, a phenolic antioxidant may be added at the time of graft reaction, but the addition thereof is not preferred when the graft polymerization catalyst is not added.

The amount of the glycidyl compound is 0.01-30 parts by weight, preferably 0.1-10 parts by weight, per 100 parts by weight of the polypropylene. When the amount of the glycidyl compound is less than 0.01 parts by weight, a high graft ratio is hardly achieved in the resulting modified polypropylene, and when it exceeds 30 parts by weight, the resulting modified polypropylene suffers from a remarkable decrease in a molecular weight.

Since the modified polypropylene (graft copolymer) thus obtained suffers from only small decrease in a molecular weight, the modified polypropylene can have such a high molecular weight that cannot be achieved by the conventional method. In addition, the glycidyl compounds used in the method of the present invention do not generate an unpleasant odor at grafting. Further, they do not suffer from any discoloration, showing remarkable improvement over the modified polypropylene produced by using maleic anhydride, etc.

The modified polypropylene preferably has a melt flow rate (MFR, 230° C., 2.16 kg load) of 0.1-100 g/10 minutes.

[B] Modified Polyethylene

The modified polyethylene is produced in the same manner as in the case of the modified polypropylene except that the melt-blending temperature is 160°-300° C. The proportion of the glycidyl compound to the polyethylene is the same as in the case of the modified polypropylene.

[C] Modified Olefinic Elastomers

The modified olefinic elastomer comprises the olefinic elastomer grafted with the above particular glycidyl compound containing an acrylamide group and an epoxy group.

The graft polymerization of the olefinic elastomer with the above glycidyl compound may be carried out by a melt-blending method or a solution method as described above in [A] Modified Polypropylene. In the case of the melt-blending method, an olefinic elastomer, a glycidyl compound (graft monomer), and if necessary, a catalyst are subjected to melt blending at a temperature of 180°-300° C. for 0.1-20 minutes. In the case of a solution method, the production conditions are the same as in the case of the modified polypropylene. In both cases, usual radical polymerization catalysts as described above in [A] Modified Polypropylene may be used for the graft polymerization.

The amount of the glycidyl compound grafted is 0.01-30 parts by weight, preferably 0.1-10 parts by weight, per 100 parts by weight of the olefinic elastomer.

[4] Matrix Polymers

[A] Polyamides

The polyamide resins which may be used in the present invention are polymers containing amide bonds (—CONH—), and they may be produced by (1) a ring-opening polymerization of lactams; (2) a condensation polymerization of amino carboxylic acids; (3) a condensation polymerization of diamines and dibasic acids, etc. Their examples include polyamide resins formed from aliphatic, alicyclic or aromatic diamines such as hexamethylenediamine, decamethylenediamine, dodecamethylenediamine, 2,2,4- or 2,4,4-trimethylhexamethylenediamine, 1,3- or 1,4-bis (aminomethyl) cyclohexane, bis (p-aminocyclohexylmethane), m- or p-xylylenediamine, etc., and aliphatic, alicyclic or aromatic dicarboxylic acids such as adipic acid, suberic acid, sebacic acid, cyclohexane dicarboxylic acid, terephthalic acid, isophthalic acid, etc.; polyamide resins formed from amino carboxylic acids such as 6-amino caproic acid, 11-amino undecanoic acid, 12-amino dodecanoic acid, etc.; polyamide resins formed from lactams such as $\epsilon$-caprolactam, $\omega$-dodecalactam, etc.; copolymers made of these polyamide resins; and mixtures of these polyamide resins. Specifically, the polyamide resins may be nylon 6, nylon 66, nylon 610, nylon 9, nylon 6/66, nylon 66/610, nylon 6/11, nylon 6/12, nylon 12, nylon 46, an amorphous nylon, etc. Among them, nylon 6 and nylon 66 are preferable from the viewpoint of rigidity and heat resistance.

The molecular weights of the polyamide resins are not particularly restricted, but it is preferable to use the polyamide resins with relative viscosities $\eta_r$ (measured in 98% sulfuric acid, JIS K 6810) of 0.5 or more. Particularly those having relative viscosities of 2.0 or more are preferable because of their excellent mechanical strength.

[B] Polyesters

The polyesters which may be used in the present invention are generally thermoplastic resins consisting of saturated dicarboxylic acids and saturated bivalent alcohols. Their examples include polyethylene terephthalate, polypropylene terephthalate, polytetramethylene terephthalate (polybutylene terephthalate), polyhexamethylene terephthalate, polycyclohexane-1,4-dimethylol terephthalate, polyneopentyl terephthalate, etc. Among them, polyethylene terephthalate and polybutylene terephthalate are particularly preferable.

The polyester preferably has an intrinsic viscosity $[\eta]$ of 0.30-1.8, and an end carboxyl group content of 10-200 milliequivalent/kg. Here, the intrinsic viscosity $[\eta]$ (dl/g) is determined from a solution viscosity measured in an o-chlorophenol solvent at 25° C.

Particularly, in a case where the polyester is polyethylene terephthalate, the polyethylene terephthalate preferably has an intrinsic viscosity $[\eta]$ of 0.30–1.2 and an end carboxyl group content of 10–200 milliequivalent/kg. When the intrinsic viscosity $[\eta]$ exceeds 1.2, the graft copolymer shows too high melt viscosity, leading to the formation of gels. Incidentally, the terephthalic acid component in the polyethylene terephthalate may have substituents of an alkyl group, a halogen group, etc., and the glycol component may contain, in addition to ethylene glycol, up to about 50 weight % of other glycols such as 1,4-butylene glycol, propylene glycol, hexamethylene glycol, etc.

In a case where the polyester is polybutylene terephthalate, the polybutylene terephthalate preferably has an intrinsic viscosity $[\eta]$ of 0.3–1.8 and an end carboxyl group content of 10–200 milliequivalent/kg. Incidentally, the terephthalic acid component in the polybutylene terephthalate may also have substituents of an alkyl group, a halogen group, etc., and the glycol component may contain, in addition to 1,4-butylene glycol, up to about 50 weight % of other glycols such as ethylene glycol, propylene glycol, hexamethylene glycol, etc.

[C] Polycarbonates

Polycarbonates which can be used in the present invention may be produced by (a) a reaction between bivalent phenol and a carbonate precursor such as phosgene in the presence of an acid acceptor and a molecular weight modifier, or (b) a transesterification reaction between bivalent phenol and a carbonate precursor such as diphenyl carbonate. The bivalent phenols which can be used are preferably bisphenols, particularly 2,2-bis (4-hydroxyphenyl) propane (bisphenol A). Part or total of bisphenol A may be replaced by other bivalent phenols. The other bivalent phenols than bisphenol A include hydroquinone, 4,4'-dihydroxydiphenyl, bis (4-hydroxyphenyl) alkane, bis (4-hydroxyphenyl) cycloalkane, bis (4-hydroxyphenyl) sulfide, bis (4-hydroxyphenyl) sulfone, bis (4-hydroxyphenyl) sulfoxide, bis (4-hydroxyphenyl) ketone, bis (4-hydroxyphenyl) ether, etc., and halogenated bisphenols such as bis (3,5-dibromo-4-hydroxyphenyl) propane. Homopolymers or copolymers obtained by using these bivalent phenols may also be used. Such polycarbonate resins are commercially available.

The polycarbonate preferably has a weight-average molecular weight of 10,000–100,000. When it is less than 10,000, sufficient mechanical properties cannot be provided, and when it exceeds 100,000, the moldability decreases. The more preferred weight-average molecular weight is 20,000–50,000.

[D] Styrene-Acrylonitrile Copolymers

One example of the styrene-acrylonitrile copolymers is a random copolymer consisting essentially of styrene and acrylonitrile. The acrylonitrile content is generally 2–50 weight %, preferably 20–30 weight %, based on the styrene-acrylonitrile copolymer.

Another example of the styrene-acrylonitrile copolymers is an acrylonitrile-butadiene-styrene random copolymer resin (ABS resin) containing 40 weight % or less of butadiene. The other portions of this resin may be essentially the same as the above random copolymer.

A further example of the styrene-acrylonitrile copolymers is an acrylontrile-EP rubber (ethylene-propylene rubber)-styrene random copolymer resin (AES resin) containing 40 weight % or less of the EP rubber.

The EP rubber is grafted to the acrylonitrile-styrene copolymer skeleton which may have essentially the same composition as that of the above acrylonitrile-styrene random copolymer.

These styrene-acrylonitrile copolymers have a melt flow rate (MFR, 230° C., 2.16 kg load) of 1–60 g/10 minutes, and a weight-average molecular weight (Mw) of 10,000–1,000,000.

[5] Polycaprolactone

Polycaprolactone is produced by a ring-opening addition polymerization reaction of a lactone monomer such as an ε-caprolactone monomer in the presence of an initiator or a catalyst having hydrogen groups active for the ring opening reaction. Such polycaprolactone has the following general formula (4):

wherein n is an integer of 350–900.

The catalysts used in the above ring-opening addition polymerization reaction include organic tin compounds, organic titanium compounds, organic tin halides, etc. The amount of the catalyst is 0.1–5000 ppm, preferably 10–100 ppm, per the amount of the lactone monomer. The reaction temperature is preferably about 100°–230° C., and the reaction is conducted in an inert gas atmosphere. When the reaction temperature exceeds about 230° C., the formed polymer is decomposed, failing to produce a polymer having a sufficiently large molecular weight, because the depolymerization of the polymer takes place. On the other hand, when the reaction temperature is lower than about 100° C., the reaction proceeds too slowly.

The polycaprolactone thus obtained preferably has a weight-average molecular weight (Mw) of 10,000–100,000.

[6] Fillers

[A] Glass Fibers

The glass fibers which are used in the present invention may be in any form including chopped strand, roving, etc. They preferably have a diameter of about 5–30 μm. For the purpose of adhesiveness to the modified polypropylene mix, the glass fibers are preferably surface-treated with silane coupling agents.

[B] Talc

Talc is generally a composite salt consisting of magnesium oxide and silicate, which is widely used as an inorganic filler for resins. The talc preferably has an average size of about 0.1–100 μm. It is also preferably surface-treated with silane coupling agents.

[C] Mica

Mica is generally an aluminosilicate salt, which is widely used as an inorganic filler for resins. The mica preferably has an average size of about 5–500 μm and an aspect ratio of about 10–500. It is also preferably surface-treated with silane coupling agents.

[7] Thermoplastic Resin Compositions

[A] First Embodiment

Modified Olefinic Elastomer + Polyamide

In the thermoplastic resin composition according to the first embodiment, the modified olefinic elastomer is 2–70 weight %, preferably 10–40 weight %, and the polyamide resin is 98–30 weight %, preferably 90–60 weight %.

When the modified olefinic elastomer is less than 2 weight % (when the polyamide resin exceeds 98 weight %), a sufficient effect of improving the mechanical properties such as impact resistance cannot be achieved by melt-blending. On the other hand, when the modified olefinic elastomer exceeds 70 weight % (when the polyamide resin is less than 30 weight %), the resulting composition fails to retain properties inherent in the polyamide resin.

The thermoplastic resin composition comprising the modified olefinic elastomer and the polyamide resin can be obtained by melt-blending the modified olefinic elastomer, the polyamide resin, and if necessary, various additives at a temperature of 200°–300° C., preferably 250°–280° C., using a blending machine such as a single-screw extruder, a double-screw extruder, a Banbury mixer, a kneading roll, a Brabender, etc.

By melt-blending the modified olefinic elastomer grafted with a particular glycidyl compound containing an acrylamide group and an epoxy group, with the polyamide resin, the resulting thermoplastic resin composition is provided with remarkably improved impact resistance. The reasons for obtaining such effects are not necessarily clear, but it is presumably due to the fact that since the particular glycidyl compound having an acrylamide group at one end and an epoxy group at the other end and containing a benzene ring, which shows excellent characteristics such as a reactivity, a heat resistance, etc., is used as a graft monomer for modifying the olefinic elastomer, the olefinic elastomer modified with such a graft monomer is highly compatible with the polyamide resin.

[B] Second Embodiment
Modified Olefinic Elastomer+Polyester

The proportions of the modified olefinic elastomer and the polyester are 2–70 weight %, preferably 10–40 weight %, for the modified olefinic elastomer, and 98–30 weight %, preferably 90–60 weight %, for the polyester.

When the modified olefinic elastomer is less than 2 weight % (when the polyester exceeds 98 weight %), a sufficient effect of improving the mechanical properties such as impact resistance cannot be achieved by melt-blending. On the other hand, when the modified olefinic elastomer exceeds 70 weight % (when the polyester is less than 30 weight %), the resulting composition fails to retain properties inherent in the polyester.

The thermoplastic resin composition comprising the modified olefinic elastomer and the polyester can be obtained by melt-blending the modified olefinic elastomer, the polyester, and if necessary, various additives at a temperature of 220°–300° C., preferably 240°–280° C., using the same blending machine as in the first embodiment.

By melt-blending the modified olefinic elastomer grafted with a particular glycidyl compound containing an acrylamide group and an epoxy group, with the polyester, the thermoplastic resin composition is provided with a remarkably improved impact resistance. The reasons for obtaining such effects are not necessarily clear, but it is presumably due to the fact that since the particular glycidyl compound having an acrylamide group at one end and an epoxy group at the other end and containing a benzene ring, which shows excellent characteristics such as a reactivity, a heat resistance, etc., is used as a graft monomer for modifying the olefinic elastomer, the olefinic elastomer modified with such a graft monomer is highly compatible with the polyester.

[C] Third Embodiment
Modified Olefinic Elastomer+Polycarbonate

The proportions of the modified olefinic elastomer and the polycarbonate are 2–70 weight %, preferably 10–40 weight %, for the modified olefinic elastomer, and 98–30 weight %, preferably 90–60 weight %, for the polycarbonate.

When the modified olefinic elastomer is less than 2 weight % (when the polycarbonate exceeds 98 weight %), a sufficient effect of improving the mechanical properties such as impact resistance cannot be achieved by melt-blending. On the other hand, when the modified olefinic elastomer exceeds 70 weight % (when the polycarbonate is less than 30 weight %), the resulting composition fails to retain properties inherent in the polycarbonate.

The thermoplastic resin composition comprising the modified olefinic elastomer and the polycarbonate can be obtained by blending in a molten state the modified olefinic elastomer, the polycarbonate, and if necessary, various additives at a temperature of 180°–300° C., preferably 220°–260° C., using the same blending machine as in the first embodiment.

By melt-blending the modified olefinic elastomer grafted with the particular glycidyl compound containing an acrylamide group and an epoxy group, with the polycarbonate, the thermoplastic resin composition is provided with a remarkably improved impact resistance. The reasons for obtaining such effects are not necessarily clear, but it is presumably due to the fact that since the particular glycidyl compound having an acrylamide group at one end and an epoxy group at the other end and containing a benzene ring, which shows excellent characteristics such as a reactivity, a heat resistance, etc., is used as a graft monomer for modifying the olefinic elastomer, the olefinic elastomer modified with such a graft monomer is highly compatible with the polycarbonate.

[D] Fourth and Fifth Embodiments
Modified Polypropylene with or without Polypropylene+Polyamide The modified polypropylene mix is a mixture of the modified polypropylene and the polypropylene. In the modified polypropylene mix, the percentage of the modified polypropylene is 5 weight % or more.

The proportions of the modified polypropylene mix (modified polypropylene or modified polypropylene+polypropylene) and the polyamide resin are 5–95 weight % for the modified polypropylene mix and 95–5 weight % for the polyamide resin, based on 100 weight % of the modified polypropylene mix+the polyamide resin. More preferred are 10–90 weight % for the modified polypropylene mix and 90–10 weight % for the polyamide resin.

When the modified polypropylene mix is less than 5 weight % (when the polyamide resin exceeds 95 weight %), the resulting thermoplastic resin composition suffers from too much water absorption. On the other hand, when the modified polypropylene mix exceeds 95 weight % (when the polyamide resin is less than 5 weight %), the resulting thermoplastic resin composition suffers from poor heat resistance, mechanical strength, etc.

In the case of the thermoplastic resin composition further containing the olefinic elastomer, the olefinic elastomer is 70 parts by weight or less, preferably 60 parts by weight or less, per 100 parts by weight of the total amount of the polyamide resin + the modified polypropylene mix.

The thermoplastic resin compositions of the fourth and fifth embodiments can be produced by melt-blending at a temperature of 200°-300° C., preferably 220°-260° C., for 1-60 minutes, preferably 1-20 minutes.

[E] Sixth and Seventh Embodiments

Modified Polypropylene with or without Polypropylene + Polyester

The composition of the thermoplastic resin composition according to the sixth and seventh embodiments are 5-95 weight % of the modified polypropylene mix (modified polypropylene or modified polypropylene + polypropylene) and 95-5 weight % of the polyester. More preferred are 10-90 weight % of the modified polypropylene mix and 90-10 weight % of the polyester.

When the modified polypropylene mix is less than 5 weight % (when the polyester exceeds 95 weight %), the resulting thermoplastic resin composition suffers from poor moldability. On the other hand, when the modified polypropylene mix exceeds 95 weight % (when the polyester is less than 5 weight %), the resulting thermoplastic resin composition suffers from poor impact resistance and flexural modulus.

In a case where the thermoplastic resin composition contains the olefinic elastomer, the olefinic elastomer is 70 parts by weight or less, preferably 60 parts by weight or less, based on 100 parts by weight of the total amount of the polyester + the modified polypropylene mix.

The thermoplastic resin composition can be produced by melt-blending at a temperature of 200°-300° C., preferably 220°-260° C., for 1-60 minutes, preferably 1-20 minutes.

The thermoplastic resin composition has excellent flexural modulus, impact resistance and mechanical strength, without suffering from surface peel. This is presumably due to the fact that by containing the modified polypropylene graftpolymerized with a monomer having an acrylamide group and an epoxy group, the compatibility between the polyester and the modified polypropylene mix is remarkably improved.

[F] Eighth Embodiment

Modified Polypropylene with or without Polypropylene + Styrene-Acrylonitrile Copolymer + Polycaprolactone The modified polypropylene mix (at least 5 weight % of the modified polypropylene + a remaining amount of polypropylene) is 5-95 weight %, preferably 10-90 weight %, and the styrene-acrylonitrile copolymer is 95-5 weight %, preferably 90-10 weight %, based on the total weight of these two components. When the modified polypropylene mix is less than 5 weight % (when the styrene-acrylonitrile copolymer exceeds 95 weight %), the mechanical strength, moldability, chemical resistance inherent in the modified polypropylene mix are deteriorated. On the other hand, when the modified polypropylene mix exceeds 95 weight % (when the styrene-acrylonitrile copolymer is lower than 5 weight %), the flexural modulus, etc. are deteriorated.

The thermoplastic resin composition of the eighth embodiment contains the polycaprolactone as a compatibilizer for the modified polypropylene mix and the styrene-acrylonitrile copolymer. The amount of the polycaprolactone is 2-100 parts by weight, preferably 5-70 parts by weight, per 100 parts by weight of the total amount of the modified polypropylene mix and the styrene-acrylonitrile copolymer. When the amount of the polycaprolactone is less than 2 parts by weight, sufficient compatibilization between the modified polypropylene mix and the styrene-acrylonitrile copolymer cannot be achieved. On the other hand, when it exceeds 100 parts by weight, the resulting composition shows decreased flowability and rigidity.

The thermoplastic resin composition of this embodiment can be produced by melt-blending at a temperature of 180°-300° C., preferably 200°-280° C., for 1-60 minutes, preferably 1-20 minutes.

By melt-blending the modified polypropylene mix containing 5 weight % or more of the modified polypropylene grafted with the particular glycidyl compound containing an acrylamide group and an epoxy group, with the styrene-acrylonitrile copolymer and the polycaprolactone, the resulting thermoplastic resin composition is provided with a remarkably improved surface peel resistance and mechanical properties. The reasons for obtaining such effects are not necessarily clear, but it is presumably due to the fact that since the modified polypropylene is grafted with the polycaprolactone, and that the resulting copolymer is highly compatible with the styrene-acrylonitrile copolymer in the portions of the polycaprolactone and compatible with the polypropylene in the portions of the modified polypropylene. As a result, these components are well compatibilized.

[F] Ninth Embodiment

Modified Polypropylene with or without Polypropylene + Glass Fibers

In the modified polypropylene mix, the percentage of the modified polypropylene is 2-100 weight %, preferably 10-50 weight %, based on the total weight of the mix. When amount of the modified polypropylene is less than 2 weight %, sufficient bonding to the glass fibers cannot be achieved, so that the resulting composition fails to show sufficient mechanical strength and heat resistance.

It is particularly preferable that the content of the glycidyl compound in the total amount of the modified polypropylene mix is 0.01 weight % or more. When the content of the glycidyl compound is less than 0.01 weight %, the resulting composition fails to show sufficient mechanical properties and heat resistance.

Incidentally, the unmodified polypropylene may be the above-mentioned polypropylene which is to be modified by the glycidyl compound.

The modified polypropylene mix containing such a modified polypropylene preferably has a melt flow rate (MFR, 230° C., 2.16 kg load) of 0.1-100 g/10 minutes. When the MFR is lower than 0.1 g/10 minutes, the resulting thermoplastic resin composition fails to show a good moldability. On the other hand, when it exceeds 100 g/10 minutes, the composition shows a decreased impact strength.

The composition contains 5-70 parts by weight, preferably 10-50 parts by weight, of the glass fibers per 100 parts by weight of the modified polypropylene mix. When the amount of the glass fibers is lower than 5 parts by weight, the resulting composition fails to show improved mechanical strength and heat resistance. On the other hand, when it exceeds 70 parts by weight, the moldability decreases and the resulting composition shows a poor mechanical strength.

The thermoplastic resin composition of the ninth embodiment can be produced by melt-blending at a temperature of 180°-300° C., preferably 200°-280° C., for 1-60 minutes, preferably 1-20 minutes by using such a blending machine as described above.

[H] Tenth Embodiment

Modified Polyolefin with or without Polyolefin+-Talc

The thermoplastic resin composition of the tenth embodiment comprises 50-98 weight %, preferably 60-90 weight %, of the modified polyolefin mix, and 2-50 weight %, preferably 10-40 weight %, of talc. When the amount of talc is lower than 2 weight % (when the amount of the modified polyolefin mix exceeds 98 weight %), the resulting composition does not show improved mechanical strength and heat resistance. On the other hand, when the amount of talc exceeds 50 weight % (when the amount of the modified polyolefin mix is lower than 50 weight %), the moldability decreases and the resulting composition shows decreased mechanical strength.

Incidentally, the term "modified polyolefin mix" means a mixture of a modified polyolefin and an unmodified polyolefin. The polyolefin per se means polymers and copolymers consisting of α-olefins, such as polypropylene and polyethylene as defined above. The percentage of the modified olefin in the mix is at least 2 weight %, preferably 10-60 weight % based on the overall weight of the modified polyolefin mix.

The thermoplastic resin composition of the tenth embodiment can be produced by melt-blending at a temperature of 160°-300° C., preferably 160°-260° C., for 1-60 minutes, preferably 1-20 minutes by using such a blending machine as described above.

Particularly, the melt-blending temperature is 180°-300° C., preferably 180°-260° C. in the case of using polypropylene, and 160°-300° C., preferably 160°-260° C. in the case of using polyethylene.

[I] Eleventh Embodiment

Modified Polyolefin with or without Polyolefin+-Mica

The thermoplastic resin composition of the eleventh embodiment comprises 50-98 weight %, preferably 60-90 weight %, of the modified polyolefin mix, and 2-50 weight %, preferably 10-40 weight %, of mica. When the amount of mica is lower than 2 weight % (when the amount of the modified polyolefin mix exceeds 98 weight %), the resulting composition does not show improved mechanical strength and heat resistance. On the other hand, when the amount of mica exceeds 50 weight % (when the amount of the modified polyolefin mix is lower than 50 weight %), the moldability decreases and the resulting composition shows decreased mechanical strength.

Incidentally, the modified polyolefin mix is the same as defined in [7] [H] Tenth Embodiment.

The melt-blending conditions are also the same as those of the tenth embodiment.

[8] Production of Modified Polyolefin-Polyester Graft Copolymer

To carry out the graft polymerization of the modified polyolefin and the polyester, they are dry-blended and then melt-blended. In the case of using the modified polypropylene, the melt blending is carried out at a temperature of 240°-320° C., particularly 260°-300° C., for 0.5-30 minutes in an extruder, particularly in a double-screw extruder. When the reaction temperature is lower than 240° C., a sufficient graft ratio cannot be achieved in the resulting graft copolymer, and when it exceeds 320° C., an excessive reaction takes place, resulting in the clogging of the extruder by the formation of gels and in the deterioration of the modified polypropylene.

The proportion of the polyester to the modified polypropylene is such that the polyester is 10-90 parts by weight, and the modified polypropylene is 90-10 parts by weight. When the polyester is lower than 10 parts by weight or exceeds 90 parts by weight, the amount of the graft copolymer formed undesirably decreases. The preferred amount of the polyester is 20-80 parts by weight, and the preferred amount of the modified polypropylene is 80-20 parts by weight.

Incidentally, for the purpose of improving its graft ratio, the graft polymerization reaction may be carried out in the presence of an acid catalyst.

The acid catalysts which may be used in the present invention include sulfuric acid, phosphoric acid, hydrogen fluoride, an organic sulfonate, etc. Among them, organic sulfonates are preferable, and p-toluenesulfonate is particularly preferable.

The amount of the acid catalyst is 0.01-5 parts by weight, per 100 parts by weight of the total amount of the modified polypropylene and the polyester. When the amount of the acid catalyst is less than 0.01 parts by weight, a sufficient graft ratio cannot be achieved in the resulting graft copolymer, and when it exceeds 5 parts by weight, an excessive reaction takes place, undesirably leading to the formation of gels. The preferred amount of the acid catalyst is 0.1-3 parts by weight.

Further, in the course of melt-blending the polyester and the modified polypropylene, 0.05-2.0 parts by weight of water per 100 parts by weight of the total amount of the modified polypropylene and the polyester, may be added for the purpose of further preventing the formation of gels. When the amount of water is less than 0.05 parts by weight, sufficient effects of preventing the formation of gels cannot be achieved in the resulting graft copolymer, and when it exceeds 2.0 parts by weight, the molecular weight of the resulting graft copolymer becomes too low, failing to improve its compatibilizing capability. In the case of using an extruder, water is continuously supplied by a pump to the extruder. In a preferred embodiment, water is supplied to the extruder in a blending zone or a subsequent zone of the extruder.

To achieve a further improvement of the graft ratio of the resulting graft copolymer, the melt-blended product may be subjected to a heat treatment at a temperature which is lower than the melting point of the polyester by 50°-150° C. for 1-100 hours in an inert gas atmosphere.

When the heat treatment is carried out at a temperature higher than "the melting point of the polyester −50° C.," the decomposition of the polymers in the resin compositions and the melting of the pellets are likely to take place. On the other hand, when it is carried out at a temperature lower than "the melting point of the polyester −150° C.," a sufficiently high graft ratio cannot be achieved in the heat-treated graft copolymer. Incidentally, when the polyethylene terephthalate is used as the polyester, the preferred heat treatment temperature is 120°-230° C.

In general, the heat treatment time depends upon the heat treatment temperature. However, when it is less than 1 hour, sufficient effects of improving the graft ratio cannot be achieved, and when it exceeds 100 hours, a further improvement in the graft ratio cannot be achieved. The preferred heat treatment time is 5-50 hours.

The heat treatment is carried out in an inert gas atmosphere, in which the melt-blended products suffer from substantially no deterioration of properties. The inert gas atmosphere may be a non-reactive atmosphere such as nitrogen, hydrogen or vacuum. Particularly, from the practical point of view, the heat treatment is preferably carried out in a nitrogen gas stream.

Incidentally, in order to carry out the heat treatment efficiently, the melt-blended product is preferably in the form of granular pellets.

Since the modified polypropylene-polyester graft copolymer thus obtained has a high graft ratio, it is highly useful for a compatibilizer for polyolefins and engineering plastics such as polycarbonate resins, etc. The amount of the modified polypropylene-polyester graft copolymer is 1-30 parts by weight per 100 parts by weight of the total amount of the modified polypropylene-polyester graft copolymer and the engineering plastics.

[9] Production of Glass Fiber-Reinforced Polypropylene Resin Composition

This method is carried out by using 100 parts by weight of polypropylene, 0.1-15 parts by weight of the glycidyl compound and 5-70 parts by weight, preferably 10-50 parts by weight, of glass fibers.

When the amount of the glycidyl compound is lower than 0.1 parts by weight per 100 parts by weight of polypropylene, the modification effect of polypropylene with the glycidyl compound is insufficient. On the other hand, when it exceeds 15 parts by weight, the resulting modified polypropylene has a decreased molecular weight.

With respect to the glass fibers, when its amount is lower than 5 parts by weight, the resulting composition does not show sufficiently improved mechanical strength and heat resistance, and when it exceeds 70 parts by weight, the moldability decreases and the resulting composition has a low mechanical strength.

In this method, a radical polymerization catalyst may be used to increase the modifying effect of the glycidyl compound. The radical polymerization catalyst may be the same as those recited in [3] [A] Modified Polypropylene. The amount of the radical polymerization catalyst is 0.01-5 parts by weight, preferably 0.1-1 parts by weight, per 100 parts by weight of polypropylene.

The above components are melt-blended at a temperature of 170°-300° C., preferably 180°-250° C., by using the same blending machine as in [7] [A] First Embodiment. Incidentally, the glass fibers may be dry-blended with polypropylene pellets in advance, or when the extruder is used polypropylene and the glycidyl compound are first melt-blended and then the glass fibers are supplied to the extruder at an intermediate point thereof by a gravity feeder.

In this method, since polypropylene, the glycidyl compound monomer and the glass fibers are melt-blended, the modification of polypropylene with the glycidyl compound can be carried out at the same time of blending polypropylene and the glass fibers. Accordingly, not only production efficiency is improved, but also the discoloration of the modified polypropylene can be prevented.

In the resulting fiber-reinforced thermoplastic resin composition, the modified polypropylene and the glass fibers are well bonded to each other. Accordingly, the fiber-reinforced thermoplastic resin composition shows improved mechanical strength such as impact strength, rigidity, etc., good heat resistance and little discoloration. This effect is obtained for the reason that the glycidyl compound having a particular structure as shown in [2] Graft Monomers is used.

Incidentally, the thermoplastic resin composition of the present invention may further contain other additives such as thermostabilizers, anti-oxidants, photostabilizers, flame retarders, plasticizers, anti-static agents, parting agents, foaming agents, nucleating agents, etc. to improve their properties.

The present invention will be explained in further detail by way of the following Examples.

Incidentally, in each of Examples and Comparative Examples, the following starting materials and additives were used:

[1] Olefinic elastomer

EBR: Ethylene-butene copolymer rubber [EBM2041P, manufactured by Japan Synthetic Rubber Co., Ltd., butene content: 80%, melt flow rate (MFR, 230° C., 2.16 kg load)=1.5 g/10 minutes].

EPR: Ethylene-propylene copolymer rubber [PO180, manufactured by Mitsui Petrochemical Industries, Ltd., propylene content: 70%, melt flow rate (MFR, 230° C., 2.16 kg load)=1.7 g/10 minutes].

CMEPR: Modified ethylene-propylene copolymer produced by melt-blending 100 parts by weight of an ethylene-propylene copolymer rubber [EPR] with 3 parts by weight of MAH and 0.1 parts by weight of POX under the same conditions as in Synthesis Example 1 (MFR: 2.5 g/10 minutes, graft ratio: 1.4 weight %).

[2] Polypropylene

HPP1: Propylene homopolymer [J209, manufactured by Tonen Chemical Corporation, melt flow rate (MFR, 230° C., 2.16 kg load)=9 g/10 minutes].

HPP2: Propylene homopolymer [Y201, manufactured by Tonen Chemical Corporation, melt flow rate (MFR, 230° C., 2.16 kg load)=1.5 g/10 minutes].

RPP: Propylene-ethylene random copolymer [ethylene content: 2 weight %, melt flow rate=1.0 g/10 minutes].

BPP: Propylene-ethylene block copolymer [BJ309, manufactured by Tonen Chemical Corporation, ethylene content: 7.5 weight %, melt flow rate (MFR, 230° C., 2.16 kg load)=9.0 g/10 minutes].

PPDM1: Propylene-1,9-decadiene (DD) random copolymer [DD content: 0.4 weight %, melt flow rate=5 g/10 minutes].

PPDM2: Propylene-7-methyl-1,6-octadiene (MOD) random copolymer [MOD content: 1.0 weight %, melt flow rate=2 g/10 minutes].

[3] Polyethylene

HDPE: High-density polyethylene [J6170 V manufactured by Tonen Chemical Corporation, melt index (MI, 190° C., 2.16 kg load)=8.0 g/10 minutes, density: 0.961 g/cm$^3$].

[4] Graft monomer

AXE: Glycidyl compound (manufactured by Kanegafuchi Chemical Industry Co., Ltd.) represented by the following general formula:

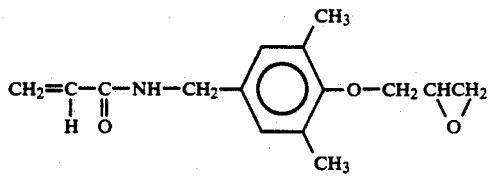

MAH: Maleic anhydride.
GMA: Glycidyl methacrylate.

[5] Radical generator
  POX: Perhexyne 2-5B (manufactured by Nippon Oil and Fats Co., Ltd.).

[6] Acid catalyst
  p-TSA: Para-toluenesulfonic acid (guaranteed grade, manufactured by Tokyo Chemicals Co. Ltd.).

[7] Polyamide resin
  Ny-6: Nylon-6 (A1030BRL, manufactured by Unitika, Ltd.).
  Ny-66$_{(1)}$: Nylon-66 (MARANYL A125, manufactured by ICI)
  Ny-66$_{(2)}$: Nylon-66 (AMIRAN 3001N, manufactured by Toray Industries, Inc.)
  AmNy: Amorphous nylon (XE 3038, manufactured by EMS)

[8] Polyester
  PET: Polyethylene terephthalate (TR4500, manufactured by Teijin, Ltd., weight-average molecular weight: 104,000, intrinsic viscosity [$\eta$]: 0.7, end carboxyl group content: 35 milliequivalent/kg).
  PBT1: Polybutylene terephthalate (C7000N, manufactured by Teijin, Ltd., intrinsic viscosity [$\eta$]: 1.05, end carboxyl group content: mil-liequivalent/kg).
  PBT2: Polybutylene terephthalate (TRB-K, manufactured by Teijin, Ltd., weight-average molecular weight: 38,000, intrinsic viscosity [$\eta$]: 0.73, end carboxyl group content: 60 milliequivalent/kg).

[9] Polycarbonate
  PC: L1225 (manufactured by Teijin Chemicals, Ltd.).

[10] Styrene-acrylonitrile random copolymer
  AS: Styrene-acrylonitrile random copolymer [230, manufactured by Japan Synthetic Rubber Co., Ltd., melt flow rate (MFR, 230° C., 2.16 kg load)=6.62 g/10 minutes, acrylonitrile content: 25 weight %].
  ABS: Acrylonitrile-butadiene-styrene resin [ABS-10, manufactured by Japan Synthetic Rubber Co., Ltd., melt flow rate (MFR, 240° C., 2.16 kg load)=10 g/10 minutes, acrylonitrile content: 25 weight %].

[11] Polycaprolactone
  PCL1: [PLACCEL H-7, weight-average molecular weight (Mw): $7 \times 10^4$ to $10 \times 10^4$, melt flow rate (MFR, 230° C., 2.16 kg load)=16.9 g/10 minutes].
  PCL2: [PLACCEL H-4, weight-average molecular weight (Mw): $4 \times 10^4$].

[12] Styrene-ethylene.butylene-styrene block copolymer
  SEBS: [Kraton G-1650, manufactured by Shell Kagaku K.K.]

[13] Filler
  GF1: Glass fiber [CS03MA486A, manufactured by Asahi Fiber Glass K.K., having a fiber diameter of about 13 μm].
  GF2: Glass fiber [CS03MAFT2A, manufactured by Asahi Fiber Glass K.K., having a fiber diameter of about 13 μm].
  Talc LMR-100 manufactured by Fuji Talc K.K.
  Mica 200 HK manufactured by Kuraray Co., Ltd.

SYNTHESIS EXAMPLE 1

Synthesis of CMPP1

100 parts by weight of a propylene homopolymer (HPP2) was mixed with 2 parts by weight of AXE and 0.1 parts by weight of POX. The resulting mixture was melt-blended at a temperature of 200° C. and at 30 rpm in a single-screw extruder having a diameter of 30 mm and L/D of 25 to produce a modified polypropylene (CMPP1). CMPP1 had an MFR of 20.0 g/10 minutes and a graft ratio of 1.5 weight %.

Incidentally, the graft ratio of AXE was calculated by the following method. The modified polypropylene (CMPP1) was dissolved in a boiling xylene to remove an undissolved fraction. A dissolved fraction of the modified polypropylene was precipitated by methanol, and the resulting precipitate was pressed to a thickness of about 50 μm to conduct an IR spectrum measurement. The graft ratio was defined as a ratio of a peak (1648 cm$^{-1}$) representing the vibration of the C=O bond of AXE to one peak (840 cm$^{-1}$) peculiar to isotactic PP.

SYNTHESIS EXAMPLE 2

Synthesis of CMPP2

Synthesis Example 1 was repeated except for changing the amount of AXE to 5 parts by weight to produce a modified polypropylene (CMPP2). CMPP2 had an MFR of 42.3 g/10 minutes and a graft ratio of 2.0 weight %.

SYNTHESIS EXAMPLE 3

Synthesis of CMPP3

100 parts by weight of a copolymer of propylene and 1,9-decadiene (PPDM1) as a polypropylene component was mixed with 5 parts by weight of AXE and 0.1 parts by weight of POX. The resulting mixture was melt-blended under the same conditions as in Synthesis Example 1 to produce a modified polypropylene (CMPP3). CMPP3 had an MFR of 12.3 g/10 minutes and a graft ratio of 2.5 weight %.

SYNTHESIS EXAMPLE 4

Synthesis of CMPP4

Synthesis Example 1 was repeated to produce a modified polypropylene (CMPP4) except for using 2 parts by weight of maleic anhydride in place of AXE as a graft monomer. CMPP4 had an MFR of 17.1 g/10 minutes and a graft ratio of 0.2 weight %.

Incidentally, the graft ratio of the maleic anhydride was measured by pressing the modified polypropylene to a thickness of about 50 μm and conducting an IR spectrum measurement, and the graft ratio was defined as a ratio of a peak (1780 cm$^{-1}$) representing the vibration of the C=O bond of maleic anhydride to one peak (840 cm$^{-1}$) peculiar to isotactic PP.

SYNTHESIS EXAMPLE 5

Synthesis of CMPP5

Synthesis Example 1 was repeated to produce a modified polypropylene (CMPP5) except for using 2 parts by weight of glycidyl methacrylate (GMA) in place of AXE as a graft monomer. CMPP5 had an MFR of 16.8 g/10 minutes and a graft ratio of 0.1 weight %.

Incidentally, the graft ratio of glycidyl methacrylate was determined by pressing the modified polypropylene to a thickness of about 50 μm and conducting an IR spectrum measurement. The graft ratio was defined as a ratio of a peak (1150 cm$^{-1}$) representing the vibration of the carbonyl group of glycidyl methacrylate to one peak (840 cm$^{-1}$) peculiar to isotactic PP.

SYNTHESIS EXAMPLE 6

Synthesis of CMPP6

100 parts by weight of a propylene homopolymer (HPP2) was dry-blended with 2 parts by weights of AXE and 0.1 parts by weight of POX, and then melt-blended at a temperature of 200° C. and at 80 rpm for 5 minutes in a laboplastomill to produce a modified polypropylene (CMPP6). CMPP6 had an MFR of 24.0 g/10 minutes and an AXE graft ratio of 1.8 weight %. Incidentally, the graft ratio of AXE was determined in the same manner as in Synthesis Example 1.

SYNTHESIS EXAMPLE 7

Synthesis of CMPP7

100 parts by weight of a propylene-1,9-decadiene random polymer (PPDM1) was dry-blended with 2 parts by weight of AXE and 0.1 parts by weight of POX, and then melt-blended at a temperature of 200° C. and at 80 rpm for 5 minutes in a laboplastomill to produce a modified polypropylene (CMPP7). CMPP7 had an MFR of 19 g/10 minutes and an AXE graft ratio of 1.8 weight %.

SYNTHESIS EXAMPLE 8

Synthesis of CMPP8

100 parts by weight of a propylene homopolymer (HPP2) was dry-blended with 1 part by weight of maleic anhydride and 0.1 parts by weight of POX, and then melt-blended at a temperature of 200° C. and at 80 rpm for 5 minutes in a laboplastomill to produce a modified polypropylene (CMPP8). CMPP8 had an MFR of 41 g/10 minutes and an MAH graft ratio of 0.2 weight %.

SYNTHESIS EXAMPLE 9

Synthesis of CMPE 100 parts by weight of a high-density polyethylene (HDPE) was dry-blended with 2 parts by weight of AXE and 0.1 parts by weight of POX, and then melt-blended at a temperature of 200° C. and at 80 rpm in an extruder (30 mm diameter) to produce a modified polyethylene (CMPE). CMPE had an MI of 4.5 g/10 minutes and an AXE graft ratio of 1.9 weight %. Incidentally, the graft ratio of AXE was determined in the same manner as in Note (2) (i) under Table 1.

EXAMPLES 1–12, COMPARATIVE EXAMPLES 1–6

Each of various olefinic elastomers shown in Table 1 was dry-blended with a graft monomer shown in Table 1 and a radical generator in amounts shown in Table 1 by using a Henschel mixer, and then subjected to graft polymerization by melt-blending at a temperature of 200° C. and at 30 rpm for 5 minutes in a single-screw extruder having a diameter of 30 mm and L/D of 25.

With respect to each of the modified olefinic elastomers thus obtained, its melt flow rate and graft ratio of the graft monomer were evaluated. The results are shown in Table 1.

Each of the above modified olefinic elastomers was mixed with various polyamides in proportions shown in Table 1, and the resulting mixture was melt-blended at 250° C. and at 200 rpm in a double-screw extruder having a diameter of 45 mm to obtain a thermoplastic resin composition.

Each of the resulting thermoplastic resin compositions was measured with respect to a melt flow rate, an Izod impact strength at temperatures of 23° C. and −30° C., respectively, a flexural modulus, a tensile strength at yield, a tensile elongation at break and a thermal deformation temperature. The results are also shown in Table 1.

TABLE 1

| Modified Olefinic Elastomer | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Composition of Modified Olefinic Elastomer | | | | | | | | | | | | |
| Olefinic Elastomer | EBR | EBR | EBR | EPR | EPR | EPR | EBR | EBR | EBR | EBR | EBR | EBR |
| Graft Monomer | AXE | AXE | AXE | AXE | AXE | AXE | AXE | AXE | AXE | AXE | AXE | AXE |
| Amount (phr) | 3 | 3 | 3 | 3 | 3 | 3 | 3 | 3 | 3 | 3 | 3 | 3 |
| Graft Polymerization Conditions | | | | | | | | | | | | |
| Temperature (°C.) | 200 | 200 | 200 | 200 | 200 | 200 | 200 | 200 | 200 | 200 | 200 | 200 |
| Amount of POX (phr) | 0.1 | 0.1 | 0.1 | 0.1 | 0.1 | 0.1 | 0.1 | 0.1 | 0.1 | 0.1 | 0.1 | 0.1 |
| Properties of Modified Olefinic Elastomer | | | | | | | | | | | | |
| MFR (g/10 minutes)[1] | 0.32 | 0.32 | 0.32 | 2.6 | 2.6 | 2.6 | 0.32 | 0.32 | 0.32 | 0.32 | 0.32 | 0.32 |
| Graft Ratio (Weight %) of Graft Monomer[2] | 2.2 | 2.2 | 2.2 | 2.0 | 2.0 | 2.0 | 2.2 | 2.2 | 2.2 | 2.2 | 2.2 | 2.2 |
| Polyamide | Ny-6 | Ny-6 | Ny-6 | Ny-6 | Ny-6 | Ny-6 | Ny-66[1] | Ny-66[1] | Ny-66[1] | AmNy | AmNy | AmNy |
| Weight Ratio of Modified Olefinic Elastomer/ Polyamide | 10/90 | 20/80 | 30/70 | 10/90 | 20/80 | 30/70 | 10/90 | 20/80 | 30/70 | 10/90 | 20/80 | 30/70 |
| Properties of Thermoplastic Resin Composition | | | | | | | | | | | | |
| MFR (g/10 minutes)[3] | 84.9 | 56.4 | 24.3 | 74.6 | 43.9 | 16.5 | 48.3 | 30.9 | 8.9 | 14.3 | 12.3 | 10.9 |
| Izod Impact Strength[4] | | | | | | | | | | | | |

TABLE 1-continued

| (kgfcm/cm) | | | | | | | | | | | | |
|---|---|---|---|---|---|---|---|---|---|---|---|---|
| at 23° C. | 29.3 | 52.0 | 79.5 | 24.3 | 46.4 | 69.5 | 20.9 | 56.3 | 74.2 | 20.4 | 26.3 | 40.9 |
| at −30° C. | 19.3 | 20.4 | 28.5 | 18.6 | 20.9 | 31.4 | 20.3 | 24.6 | 34.7 | 9.6 | 12.3 | 19.4 |
| Flexural Modulus[5] (kgf/cm$^2$) | 18800 | 15300 | 11800 | 19600 | 14900 | 10900 | 21500 | 17500 | 14300 | 19700 | 17700 | 14900 |
| Tensile Strength at Yield[6] (kgf/cm$^2$) | 550 | 480 | 420 | 530 | 470 | 400 | 721 | 586 | 443 | 729 | 714 | 609 |
| Tensile Elongation at Break[7] (%) | 24.0 | 64.2 | 98.9 | 28.9 | 82.3 | 96.4 | 29.7 | 41.1 | 83.3 | 31.4 | 40.3 | 81.3 |
| Thermal Deformation Temp. under 4.6 kg/cm$^2$ (°C.)[8] | 171.0 | 164.9 | 144.7 | 170.4 | 163.2 | 139.8 | 213.0 | 206.0 | 119.0 | 129.0 | 129.0 | 150.0 |

| | Comparative Example No. | | | | | |
|---|---|---|---|---|---|---|
| Modified Olefinic Elastomer | 1 | 2 | 3 | 4 | 5 | 6 |
| Composition of Modified Olefinic Elastomer | | | | | | |
| Olefinic Elastomer | EBR | EBR | EBR | EBR | EBR | EBR |
| Graft Monomer | — | — | — | MAH | MAH | MAH |
| Amount (phr) | — | — | — | 3 | 3 | 3 |
| Graft Polymerization Conditions | | | | | | |
| Temperature (°C.) | — | — | — | 200 | 200 | 200 |
| Amount of POX (phr) | — | — | — | 0.1 | 0.1 | 0.1 |
| Properties of Modified Olefinic Elastomer | | | | | | |
| MFR (g/10 minutes)[1] | 1.5 | 1.5 | 1.5 | 0.6 | 0.6 | 0.6 |
| Graft Ratio (Weight %) of Graft Monomer[2] | 0 | 0 | 0 | 1.4 | 1.4 | 1.4 |
| Polyamide | Ny-6 | Ny-6 | Ny-6 | Ny-6 | Ny-66[2] | AmNy |
| Weight Ratio of Modified Olefinic Elastomer/Polyamide | 10/90 | 20/80 | 30/70 | 20/80 | 20/80 | 20/80 |
| Properties of Thermoplastic Resin Composition | | | | | | |
| MFR (g/10 minutes)[3] | 84.5 | 62.9 | 43.5 | 36.5 | 25.4 | 8.4 |
| Izod Impact Strength[4] (kgfcm/cm) | | | | | | |
| at 23° C. | 9.3 | 18.4 | 19.6 | 38.6 | 40.4 | 15.4 |
| at −30° C. | 4.2 | 10.2 | 11.3 | 12.5 | 11.3 | 3.3 |
| Flexural Modulus[5] (kgf/cm$^2$) | 18800 | 15000 | 12100 | 15100 | 17300 | 17800 |
| Tensile Strength at Yield[6] (kgf/cm$^2$) | 420 | 401 | 350 | 482 | 564 | 682 |
| Tensile Elongation at Break[7] (%) | 8.3 | 11.2 | 19.6 | 52.0 | 19.3 | 15.9 |
| Thermal Deformation Temp. under 4.6 kg/cm$^2$ (°C.)[8] | 170.2 | 169.0 | 144.7 | 168.4 | 204.0 | 127.0 |

Note:
[1]MFR: Measured according to JIS K 7210, at 190° C., 1.05 kg load.
[2]Graft ratio of modifying monomer
(i) In the case of AXE
The modified olefinic elastomer was dissolved in a boiling xylene to remove an undissolved fraction. A dissolved fraction of the modified olefinic elastomer was precipitated by methanol, and the resulting precipitate was pressed to a thickness of about 50 μm to conduct an IR spectrum measurement. The graft ratio was defined as a ratio of a peak (1648 cm$^{-1}$) representing the vibration of the C=O bond of AXE to a sample thickness.
(ii) In the case of MAH
The modified olefinic elastomer was pressed to a thickness of about 50 μm to conduct an IR spectrum measurement, and the graft ratio was defined as a ratio of a peak (1780 cm$^{-1}$) representing the vibration of the C=O bond of maleic anhydride to a sample thickness.
[3]MFR: Measured according to JIS K 7210, at 275° C., 2.16 kg load.
[4]Izod impact strength: Measured according to JIS K 7110.
[5]Flexural modulus: Measured according to JIS K 7203.
[6]Tensile strength at yield: Measured according to JIS K 6767.
[7]Tensile elongation at break: Measured according to JIS K 6767.
[8]Thermal deformation temperature: Measured according to JIS K 7207.

As is clear from Table 1, the thermoplastic resin compositions of Examples 1–12 were excellent in a combination of the impact resistance, the flexural modulus, the tensile strength at yield, the tensile elongation at break and the thermal deformation temperature.

On the other hand, in the case of the blends in Comparative Examples 1–3 each comprising a polyamide resin and an unmodified olefinic elastomer, they suffered from poor impact resistance, tensile strength at yield and tensile elongation at break. In the case of the blends in Comparative Examples 4–6 comprising the polyamide resins and the modified olefinic elastomers grafted with maleic anhydride, they had a lower impact resistance than the thermoplastic resin compositions of the corresponding Examples.

This is presumably due to the fact that although the maleic anhydride-grafted olefinic elastomer has a better compatibility with the polyamide resin than the unmodified olefinic elastomer, it still has a poorer compatibility as compared to the modified olefinic elastomer of the present invention.

EXAMPLES 13-21, COMPARATIVE EXAMPLES 7-11

Each of various olefinic elastomers shown in Table 2 was dry-blended with a graft monomer and a radical generator in amounts shown in Table 2 by using a Henschel mixer, and then subjected to graft polymerization by melt-blending at a temperature of 200° C. and at 30 rpm for 5 minutes in a single-screw extruder having a diameter of 30 mm and L/D of 25.

With respect to each of the modified olefinic elastomers thus obtained, its melt flow rate and graft ratio of the graft monomer were evaluated. The results are shown in Table 2.

Each of the above modified olefinic elastomers was mixed with various polyesters in proportions shown in Table 2. The resulting mixture was melt-blended at 250° C. and at 200 rpm in a double-screw extruder having a diameter of 45 mm to obtain a thermoplastic resin composition.

Each of the resulting thermoplastic resin compositions was measured with respect to a melt flow rate, an Izod impact strength at temperatures of 23° C. and −30° C., respectively, a flexural modulus, a tensile strength at yield and a tensile elongation at break. The results are also shown in Table 2.

TABLE 2

| Modified Olefinic Elastomer | Example No. | | | | | | | | |
|---|---|---|---|---|---|---|---|---|---|
| | 13 | 14 | 15 | 16 | 17 | 18 | 19 | 20 | 21 |
| Composition of Modified Olefinic Elastomer | | | | | | | | | |
| Olefinic Elastomer | EBR | EBR | EBR | EPR | EPR | EPR | EBR | EBR | EBR |
| Graft Monomer | AXE | AXE | AXE | AXE | AXE | AXE | AXE | AXE | AXE |
| Amount (phr) | 3 | 3 | 3 | 3 | 3 | 3 | 3 | 3 | 3 |
| Graft Polymerization Conditions | | | | | | | | | |
| Temperature (°C.) | 200 | 200 | 200 | 200 | 200 | 200 | 200 | 200 | 200 |
| Amount of POX (phr) | 0.1 | 0.1 | 0.1 | 0.1 | 0.1 | 0.1 | 0.1 | 0.1 | 0.1 |
| Properties of Modified Olefinic Elastomer | | | | | | | | | |
| MFR (g/10 minutes)[1] | 0.32 | 0.32 | 0.32 | 0.41 | 0.41 | 0.41 | 0.32 | 0.32 | 0.32 |
| Graft Ratio (Weight %) of Graft Monomer[2] | 2.2 | 2.2 | 2.2 | 2.0 | 2.0 | 2.0 | 2.2 | 2.2 | 2.2 |
| Polyester | PBT | PBT | PBT | PBT | PBT | PBT | PET | PET | PET |
| Weight Ratio of Modified Olefinic Elastomer/Polyester | 10/90 | 20/80 | 30/70 | 10/90 | 20/80 | 30/70 | 10/90 | 20/80 | 30/70 |
| Properties of Thermoplastic Resin Composition | | | | | | | | | |
| MFR (g/10 minutes)[3] | 46.3 | 54.2 | 61.3 | 48.9 | 59.2 | 63.1 | 22.6 | 24.3 | 28.4 |
| Izod Impact Strength[4] (kgfcm/cm) | | | | | | | | | |
| at 23° C. | 6.8 | 9.4 | 12.9 | 6.6 | 8.8 | 16.2 | 8.0 | 9.2 | 12.3 |
| at −30° C. | 4.3 | 6.0 | 9.4 | 2.9 | 6.3 | 9.4 | 4.5 | 6.3 | 9.4 |
| Flexural Modulus[5] (kgf/cm²) | 17500 | 15500 | 12500 | 17100 | 14900 | 12000 | 18800 | 16100 | 13900 |
| Tensile Strength at Yield[6] (kgf/cm²) | 346 | 323 | 315 | 348 | 331 | 321 | 403 | 399 | 394 |
| Tensile Elongation at Break[7] (%) | 94.3 | 102.4 | 86.4 | 64.2 | 58.3 | 59.4 | 36.5 | 50.4 | 54.3 |

| Modified Olefinic Elastomer | Comparative Example No. | | | | |
|---|---|---|---|---|---|
| | 7 | 8 | 9 | 10 | 11 |
| Composition of Modified Olefinic Elastomer | | | | | |
| Olefinic Elastomer | EBR | EBR | EBR | EBR | EBR |
| Graft Monomer | — | — | — | MAH | MAH |
| Amount (phr) | — | — | — | 3 | 3 |
| Graft Polymerization Conditions | | | | | |
| Temperature (°C.) | — | — | — | 200 | 200 |
| Amount of POX (phr) | — | — | — | 0.1 | 0.1 |
| Properties of Modified Olefinic Elastomer | | | | | |
| MFR (g/10 minutes)[1] | 1.5 | 1.5 | 1.5 | 0.6 | 0.6 |
| Graft Ratio (Weight %) of Graft Monomer[2] | 0 | 0 | 0 | 1.4 | 1.4 |
| Polyester | PBT | PBT | PBT | PBT | PET |
| Weight Ratio of Modified Olefinic Elastomer/Polyester | 10/90 | 20/80 | 30/70 | 30/70 | 30/70 |
| Properties of Thermoplastic Resin Composition | | | | | |
| MFR (g/10 minutes)[3] | 52.4 | 63.1 | 72.4 | 64.3 | 32.6 |
| Izod Impact Strength[4] (kgfcm/cm) | | | | | |
| at 23° C. | 2.8 | 3.6 | 5.4 | 7.3 | 7.6 |
| at −30° C. | 1.9 | 2.4 | 3.6 | 5.6 | 6.3 |
| Flexural Modulus[5] (kgf/cm²) | 17400 | 15300 | 12400 | 11900 | 13800 |
| Tensile Strength at Yield[6] (kgf/cm²) | 331 | 304 | 284 | 271 | 365 |

TABLE 2-continued

| | | | | | |
|---|---|---|---|---|---|
| Tensile Elongation at Break[7] (%) | 32.9 | 15.3 | 10.9 | 16.8 | 11.9 |

Note:
[1]MFR: Measured according to JIS K 7210, at 190° C., 1.05 kg load.
[2]Graft ratio of modifying monomer Measured in the same manner as in Note [2] under Table 1.
[3]MFR: Measured according to JIS K 7210, at 230° C., 2.16 kg load.
[4]Izod impact strength: Measured according to JIS K 7110.
[5]Flexural modulus: Measured according to JIS K 7203.
[6]Tensile strength at yield: Measured according to JIS K 6767.
[7]Tensile elongation at break: Measured according to JIS K 6767.

As is clear from Table 2, the thermoplastic resin compositions in Examples 13–21 were excellent in a combination of the impact resistance, the flexural modulus, the tensile strength at yield and the tensile elongation at break.

On the other hand, in the case of the blends of Comparative Examples 7–9 each comprising a polyester and an unmodified olefinic elastomer, they suffered from poor impact resistance and tensile elongation at break. In the case of the blends of Comparative Examples 10 and 11 comprising the polyesters and the modified olefinic elastomers grafted with maleic anhydride, they had lower impact resistance and tensile elongation at break than the thermoplastic resin compositions of Examples.

This is presumably due to the fact that although the maleic anhydride-grafted olefinic elastomer has a better compatibility with the polyester resin than the unmodified olefinic elastomer, it still has a poorer compatibility as compared to the modified olefinic elastomer of the present invention.

EXAMPLES 22–29

Each of various olefinic elastomers shown in Table 3 was dry-blended with a graft monomer and a radical generator in amounts shown in Table 3 by using a Henschel mixer, and then subjected to graft polymerization by melt-blending at a temperature of 200° C. and at 30 rpm in a single-screw extruder having a diameter of 30 mm and L/D of 25.

With respect to each of the modified olefinic elastomers thus obtained, its melt flow rate and graft ratio of the graft monomer were evaluated. The results are shown in Table 3.

Each of the above modified olefinic elastomers was mixed with a polycarbonate (PC) in proportions shown in Table 3, and melt-blended at 250° C. and at 200 rpm in a double-screw extruder having a diameter of 45 mm to obtain a thermoplastic resin composition.

Each of the resulting thermoplastic resin compositions was measured with respect to a melt flow rate, an Izod impact strength at temperatures of 23° C. and −30° C., respectively, a flexural modulus, a tensile strength at yield, a tensile elongation at break and a thermal deformation temperature. The results are also shown in Table 3.

COMPARATIVE EXAMPLE 12

In the case of using the polycarbonate alone, its melt flow rate, Izod impact strength at temperatures of 23° C. and −30° C., flexural modulus, tensile strength at yield, tensile elongation at break and thermal deformation temperature were measured in the same manner as in Example 22. The results are shown in Table 3.

COMPARATIVE EXAMPLES 13–15

An ethylene-butene copolymer rubber (EBR) was mixed with a polycarbonate (PC) in proportions shown in Table 3, and melt-blended at a temperature of 250° C. and at 200 rpm in a double-screw extruder having a diameter of 45 mm to produce a thermoplastic resin composition.

Each of the resulting thermoplastic resin compositions was measured with respect to a melt flow rate, an Izod impact strength at temperatures of 23° C. and −30° C., respectively, a flexural modulus, a tensile strength at yield, a tensile elongation at break and a thermal deformation temperature in the same manner as in Example 22. The results are also shown in Table 3.

COMPARATIVE EXAMPLES 16

An ethylene-butene copolymer rubber (EBR) was dry-blended with maleic acid as a graft monomer and a radical generator in amounts shown in Table 3 by using a Henschel mixer, and then subjected to graft polymerization by melt-blending at a temperature of 200° C. and at 30 rpm in a single-screw extruder having a diameter of 30 mm and L/D of 25.

With respect to the modified olefinic elastomer thus obtained, its melt flow rate and graft ratio of the graft monomer were evaluated. The results are shown in Table 3.

The modified olefinic elastomer was mixed with a polycarbonate in a proportion shown in Table 3. The resulting mixture was melt-blended at 250° C. and at 200 rpm in a double-screw extruder having a diameter of 45 mm to obtain a thermoplastic resin composition.

The resulting thermoplastic resin composition was measured with respect to a melt flow rate, an Izod impact strength at temperatures of 23° C. and −30° C., respectively a flexural modulus, a tensile strength at yield, a tensile elongation at break and a thermal deformation temperature. The results are also shown in Table 3.

TABLE 3

| Modified Olefinic Elastomer | Example No. | | | | | | | | Comparative Example No. | | | | |
|---|---|---|---|---|---|---|---|---|---|---|---|---|---|
| | 22 | 23 | 24 | 25 | 26 | 27 | 28 | 29 | 12 | 13 | 14 | 15 | 16 |
| Composition of Modified Olefinic Elastomer | | | | | | | | | | | | | |
| Olefinic Elastomer | EBR | EBR | EBR | EBR | EPR | EPR | EPR | EPR | — | EBR | EBR | EBR | EBR |
| Graft Monomer | AXE | AXE | AXE | AXE | AXE | AXE | AXE | AXE | — | — | — | — | MAH |

TABLE 3-continued

| Modified Olefinic Elastomer | Example No. | | | | | | | | Comparative Example No. | | | | |
|---|---|---|---|---|---|---|---|---|---|---|---|---|---|
| | 22 | 23 | 24 | 25 | 26 | 27 | 28 | 29 | 12 | 13 | 14 | 15 | 16 |
| Amount (phr) | 3 | 3 | 3 | 3 | 3 | 3 | 3 | 3 | — | — | — | — | 3 |
| Graft Polymerization Conditions | | | | | | | | | | | | | |
| Temperature (°C.) | 200 | 200 | 200 | 200 | 200 | 200 | 200 | 200 | — | — | — | — | 200 |
| Amount of POX (phr) | 0.1 | 0.1 | 0.1 | 0.1 | 0.1 | 0.1 | 0.1 | 0.1 | — | — | — | — | 0.1 |
| Properties of Modified Olefinic Elastomer | | | | | | | | | | | | | |
| MFR (g/10 minutes)[1] | 0.32 | 0.32 | 0.32 | 0.32 | 2.6 | 2.6 | 2.6 | 2.6 | — | 1.5 | 1.5 | 1.5 | 0.6 |
| Graft Ratio (Weight %) of Graft Monomer[2] | 2.2 | 2.2 | 2.2 | 2.2 | 2.0 | 2.0 | 2.0 | 2.0 | — | 0 | 0 | 0 | 1.4 |
| Weight Ratio of Modified Olefinic Elastomer/ Polycarbonate | 10/90 | 20/80 | 30/70 | 40/60 | 10/90 | 20/80 | 30/70 | 40/60 | 0/100 | 10/90 | 20/80 | 30/70 | 20/80 |
| Properties of Thermoplastic Resin Composition | | | | | | | | | | | | | |
| MFR (g/10 minutes)[3] | 3.8 | 3.2 | 2.5 | 2.3 | 4.2 | 4.4 | 4.6 | 4.5 | 4.3 | 4.0 | 3.4 | 2.2 | 1.8 |
| Izod Impact Strength[4] | | | | | | | | | | | | | |
| at 23° C. (kgfcm/cm) | 59.3 | 64.5 | 70.3 | 79.6 | 59.6 | 66.2 | 72.0 | 78.4 | 56.8 | 50.4 | 41.3 | 39.7 | 42.3 |
| at −30° C. | 24.5 | 34.3 | 46.5 | 52.2 | 25.6 | 38.4 | 50.2 | 59.8 | 10.8 | 12.0 | 18.9 | 32.1 | 32.9 |
| Flexural Modulus[5] (kgf/cm$^2$) | 19500 | 16500 | 13300 | 10900 | 19200 | 16200 | 13100 | 10700 | 21000 | 19400 | 16300 | 13000 | 12100 |
| Tensile Strength at Yield[6] (kgf/cm$^2$) | 615 | 532 | 454 | 400 | 601 | 503 | 421 | 364 | 623 | 604 | 480 | 370 | 341 |
| Tensile Elongation at Break[7] (%) | 106.3 | 121.4 | 125.6 | 130.2 | 109.2 | 121.5 | 130.0 | 121.3 | 105.2 | 93.4 | 70.5 | 64.3 | 38.1 |
| Thermal Deformation Temp. under 4.6 kg/cm$^2$ (°C.)[8] | 139.0 | 139.8 | 140.2 | 134.6 | 137.6 | 137.9 | 138.1 | 130.3 | 139.3 | 138.4 | 139.6 | 140.2 | 140.3 |

Note:
[1]MFR: Measured according to JIS K 7210, at 190° C., 1.05 kg load.
[2]Graft ratio of modifying monomer Measured in the same manner as in Note (2) under Table 1.
[3]MFR: Measured according to JIS K 7210, at 250° C., 2.16 kg load.
[4]Izod impact strength: Measured according to JIS K 7110.
[5]Flexural modulus: Measured according to JIS K 7203.
[6]Tensile strength at yield: Measured according to JIS K 6767.
[7]Tensile elongation at break: Measured according to JIS K 6767.
[8]Thermal deformation temperature: Measured according to JIS K 7207.

As is clear from Table 3, the thermoplastic resin compositions of Examples 22-29 were excellent in a combination of the impact resistance, the flexural modulus, the tensile strength at yield, the tensile elongation at break and the thermal deformation temperature.

On the other hand, in the case of using polycarbonate alone in Comparative Example 12 and in the case of the blends of Comparative Examples 13-15 each comprising a polycarbonate and an unmodified olefinic elastomer, they suffered from a poor impact resistance. In the case of the blend of Comparative Example 16 comprising a polycarbonate and a modified olefinic elastomer grafted with maleic anhydride, it had lower impact resistance and flexural modulus than the thermoplastic resin composition of Example 23.

This is presumably due to the fact that although the maleic anhydride-grafted olefinic elastomer has a better compatibility with the polycarbonate than the unmodified olefinic elastomer, it still has a poorer compatibility as compared to the modified olefinic elastomer of the present invention.

EXAMPLES 30-47, COMPARATIVE EXAMPLES 17-22

Various polyamides, polypropylenes, modified polypropylenes (CMPP1-CMPP5) and olefinic elastomers shown in Table 4 were dry-blended in amounts shown in Table 4 by using a Henschel mixer. Each of the resulting mixture was then subjected to graft polymerization by melt-blending at a temperature of 250° C. and at 200 rpm in a double-screw extruder having a diameter of 45 mm.

Next, the resulting blends were formed into test pieces for measuring various properties. With respect to each test piece, a melt flow rate, a surface peel resistance, an Izod impact strength, a tensile strength, a tensile elongation at break, a flexural modulus, a water absorption ratio and a surface gloss were measured. Each measurement was conducted by the following method.

(1) Melt flow rate
Measured according to JIS K 6758.

(2) Surface peel resistance
   The surface of each test piece was cut out by a razor in a checkered pattern to have 100 checkers of 1 mm×1 mm. An adhesive cellophane tape (manufactured by Nichiban Co., Ltd.) was adhered onto the sample surface and then peeled off. The number of remaining checkers was counted.
(3) Izod impact strength
   Measured according to JIS K 7110.
(4) Tensile strength
   Measured according to JIS K 7113.
(5) Tensile elongation at break
   Measured according to JIS K 7113.
(6) Flexural modulus
   Measured according to JIS K 7203.
(7) Water absorption ratio
   Each test piece was immersed in warm water at 50° C. for 10 hours. The water absorption ratio was calculated from the difference in weight between the test piece before immersion (dry state) and that after immersion.

$$\text{Water Absorption Ratio (\%)} = \frac{W_a - W_b}{W_a} \times 100$$

wherein
   $W_a$: Weight of test piece after immersion.
   $W_b$: Weight of test piece before immersion.
(8) Surface gloss
   Measured according to JIS K 7105.
   The results are also shown in Table 4.
   Next, for comparison, thermoplastic resin compositions having compositions shown in Table 5 were produced, and the measurement of their properties was conducted in the same manner as in Examples. The results are also shown in Table 5.

TABLE 4

| | Example No. | | | | | | | | |
|---|---|---|---|---|---|---|---|---|---|
| | 30 | 31 | 32 | 33 | 34 | 35 | 36 | 37 | 38 |
| Composition | | | | | | | | | |
| Polyamide | Ny-6 | Ny-6 | Ny-6 | Ny-6 | Ny-6 | Ny-6 | Ny-6 | Ny-6 | Ny-6 |
| Amount (Weight %) | 30 | 30 | 30 | 30 | 10 | 50 | 70 | 30 | 30 |
| Polypropylene HPP1 | 65 | 60 | 40 | — | 80 | 30 | 20 | 60 | 60 |
| BPP | — | — | — | — | — | — | — | — | — |
| Modified Polypropylene | CMPP1 | CMPP1 | CMPP1 | CMPP1 | CMPP1 | CMPP1 | CMPP1 | CMPP2 | CMPP3 |
| Amount (Weight %) | 5 | 10 | 30 | 70 | 10 | 20 | 10 | 10 | 10 |
| Olefinic Elastomer | — | — | — | — | — | — | — | — | — |
| Amount (Weight %) | — | — | — | — | — | — | — | — | — |
| Properties of Thermoplastic Resin Composition | | | | | | | | | |
| MFR (g/10 minutes)[1] | 8.4 | 6.2 | 5.4 | 3.9 | 9.7 | 8.7 | 12.1 | 5.4 | 4.9 |
| Surface Peel Resistance[2] | 95/100 | 100/100 | 100/100 | 100/100 | 100/100 | 98/100 | 100/100 | 100/100 | 100/100 |
| Izod Impact Strength[3] (kgfcm/cm) at −30° C. | 5.4 | 6.2 | 7.9 | 6.0 | 4.0 | 7.8 | 9.8 | 7.0 | 7.5 |
| Tensile Strength[4] (kgf/cm²) | 469 | 489 | 495 | 473 | 375 | 563 | 764 | 490 | 483 |
| Tensile Elongation at Break[5] (%) | 15.3 | 18.3 | 24.0 | 15.1 | 14.0 | 17.2 | 63.2 | 20.4 | 25.4 |
| Flexural Modulus[6] (kgf/cm²) | 16300 | 16200 | 16300 | 16500 | 14000 | 18100 | 22000 | 16100 | 15900 |
| Water Absorption Ratio[7] (%) | 0.22 | 0.21 | 0.21 | 0.21 | 0.03 | 0.41 | 0.92 | 0.22 | 0.22 |
| Surface Gloss[8] (%) | 74.3 | 80.4 | 81.1 | 80.4 | 80.5 | 77.6 | 80.3 | 80.5 | 79.3 |

| | Example No. | | | | | | | | |
|---|---|---|---|---|---|---|---|---|---|
| | 39 | 40 | 41 | 42 | 43 | 44 | 45 | 46 | 47 |
| Composition | | | | | | | | | |
| Polyamide | Ny-6 | Ny-66 | AmNy | Ny-6 | Ny-6 | Ny-6 | Ny-6 | Ny-6 | Ny-6 |
| Amount (Weight %) | 30 | 30 | 30 | 30 | 30 | 30 | 30 | 30 | 60 |
| Polypropylene HPP1 | — | 60 | 60 | 50 | 40 | 30 | 40 | 40 | 10 |
| BPP | 60 | — | — | — | — | — | — | — | — |
| Modified Polypropylene | CMPP1 | CMPP1 | CMPP1 | CMPP1 | CMPP1 | CMPP1 | CMPP1 | CMPP1 | CMPP1 |
| Amount (Weight %) | 10 | 10 | 10 | 10 | 10 | 10 | 10 | 10 | 10 |
| Olefinic Elastomer | — | — | — | EPR | EPR | EPR | MEPR | EBR | MEPR |
| Amount (Weight %) | — | — | — | 10 | 20 | 30 | 20 | 20 | 20 |
| Properties of Thermoplastic Resin Composition | | | | | | | | | |
| MFR (g/10 minutes)[1] | 6.1 | 3.4 | 1.3 | 5.3 | 4.8 | 3.9 | 3.2 | 4.3 | 8.3 |
| Surface Peel Resistance[2] | 100/100 | 100/100 | 100/100 | 100/100 | 95/100 | 89/100 | 100/100 | 100/100 | 100/100 |
| Izod Impact Strength[3] (kgfcm/cm) at −30° C. | 9.4 | 6.0 | 5.0 | 6.5 | 10.9 | 20.6 | 41.0 | 8.3 | 49.7 |
| Tensile Strength[4] (kgf/cm²) | 449 | 473 | 604 | 301 | 255 | 213 | 204 | 284 | 421 |
| Tensile Elongation at Break[5] (%) | 41.8 | 21.3 | 10.2 | 39.8 | 41.6 | 73.4 | 32.3 | 40.3 | 69.4 |
| Flexural Modulus[6] (kgf/cm²) | 15200 | 20800 | 16800 | 15100 | 12000 | 9900 | 8100 | 14100 | 11000 |
| Water Absorption Ratio[7] (%) | 0.22 | 0.18 | 0.03 | 0.23 | 0.22 | 0.22 | 0.18 | 0.20 | 0.71 |
| Surface Gloss[8] (%) | 71.2 | 64.3 | 71.3 | 80.1 | 78.6 | 76.4 | 75.3 | 79.6 | 80.0 |

TABLE 5

|  | Comparative Example No. | | | | | |
| --- | --- | --- | --- | --- | --- | --- |
|  | 17 | 18 | 19 | 20 | 21 | 22 |
| Composition | | | | | | |
| Polyamide | Ny-6 | — | Ny-6 | Ny-6 | Ny-6 | Ny-6 |
| Amount (Weight %) | 100 | — | 30 | 70 | 30 | 30 |
| Polypropylene HPP1 | — | 100 | 70 | 30 | 60 | 60 |
| BPP | — | — | — | — | — | — |
| Modified Polypropylene | — | — | — | — | CMPP4 | CMPP5 |
| Amount (Weight %) | — | — | — | — | 10 | 10 |
| Olefinic Elastomer | — | — | — | — | — | — |
| Amount (Weight %) | — | — | — | — | — | — |
| Properties of Thermoplastic Resin Composition | | | | | | |
| MFR (g/10 minutes)[1] | 30.4 | 9.0 | 15.9 | 8.4 | 10.4 | 17.5 |
| Surface Peel Resistance[2] | 100/100 | 100/100 | 0/100 | 0/100 | 15/100 | 5/100 |
| Izod Impact Strength[3] (kgfcm/cm) at −30° C. | 3.4 | 2.5 | 4.8 | 8.2 | 4.8 | 4.0 |
| Tensile Strength[4] (kgf/cm$^2$) | 807 | 339 | 432 | 602 | 451 | 424 |
| Tensile Elongation at Break[5] (%) | 27.4 | 34.0 | 6.7 | 11.5 | 7.2 | 5.3 |
| Flexural Modulus[6] (kgf/cm$^2$) | 25000 | 12900 | 16000 | 22000 | 16100 | 16000 |
| Water Absorption Ratio[7] (%) | 2.60 | 0 | 0.23 | 1.19 | 0.23 | 0.23 |
| Surface Gloss[8] (%) | 89.6 | 83.9 | 58.0 | 81.4 | 64.2 | 50.4 |

As is clear from Table 4, the thermoplastic resin compositions of Examples 30–47 suffered from little surface peel and had a good surface gloss. They also were excellent in a combination of the Izod impact strength, the tensile strength, the tensile elongation at break, the flexural modulus and the water absorption property.

On the other hand, as is clear from Table 5, the thermoplastic resin compositions of Comparative Examples 17 and 20 had too large water absorption. The thermoplastic resin compositions of Comparative Examples 19–22 suffered from poor surface peel resistance and surface gloss. The thermoplastic resin composition of Comparative Example 18 suffered from poor mechanical properties.

EXAMPLES 48–63, COMPARATIVE EXAMPLES 23–31

Each of various polyesters, polypropylenes, modified polypropylenes and olefinic elastomers shown in Table 6 were dry-blended in amounts shown in Table 6 by using a Henschel mixer. Each of the resulting mixture was then subjected to graft polymerization by melt-blending at a temperature of 250° C. and at 200 rpm in a double-screw extruder having a diameter of 45 mm.

Next, the resulting blends were formed into test pieces for measuring various properties. With respect to each test piece, a melt flow rate, a surface peel resistance, an Izod impact strength, a tensile strength at yield, a flexural modulus and a thermal deformation temperature were measured. Each measurement was conducted by the following method.

(1) Melt flow rate
  Measured according to JIS K 6758.
(2) Surface peel resistance
  The same as in Method (2) in Examples 30–47.
(3) Izod impact strength
  Measured according to JIS K 7110.
(4) Tensile strength at yield
  Measured according to JIS K 7113.
(5) Flexural modulus
  Measured according to JIS K 7203.
(6) Thermal deformation temperature
  Measured according to JIS K 7207.

The results are also shown in Table 6.

Next, for comparison, thermoplastic resin compositions having compositions shown in Table 7 were produced, and the measurement of their properties was conducted in the same manner as in Examples. The results are also shown in Table 7.

TABLE 6

|  | Example No. | | | | | | | |
| --- | --- | --- | --- | --- | --- | --- | --- | --- |
|  | 48 | 49 | 50 | 51 | 52 | 53 | 54 | 55 |
| Composition (Weight %) | | | | | | | | |
| Polyester | | | | | | | | |
| PET | — | — | — | — | — | — | — | — |
| PBT | 30 | 30 | 30 | 30 | 10 | 50 | 70 | 30 |
| Polypropylene | | | | | | | | |
| HPP1 | 65 | 60 | 40 | — | 80 | 30 | 20 | 60 |
| BPP | — | — | — | — | — | — | — | — |
| Modified Polypropylene | CMPP1 | CMPP1 | CMPP1 | CMPP1 | CMPP1 | CMPP1 | CMPP1 | CMPP2 |
| Amount | 5 | 10 | 30 | 70 | 10 | 20 | 10 | 10 |
| Olefinic Elastomer | — | — | — | — | — | — | — | — |
| Amount | — | — | — | — | — | — | — | — |
| Properties of Thermoplastic Resin Composition | | | | | | | | |
| MFR (g/10 minutes)[1] | 19.4 | 18.0 | 10.6 | 8.2 | 16.3 | 23.7 | 21.3 | 16.3 |
| Surface Peel Resistance[2] | 98/100 | 100/100 | 100/100 | 100/100 | 100/100 | 85/100 | 100/100 | 100/100 |

TABLE 6-continued

| | | | | | | | | |
|---|---|---|---|---|---|---|---|---|
| Izod Impact Strength[3] (kgfcm/cm) at −30° C. | 2.7 | 3.9 | 5.6 | 3.4 | 2.9 | 2.9 | 4.7 | 4.2 |
| Tensile Strength[4] (kgf/cm²) | 301 | 330 | 354 | 281 | 285 | 259 | 441 | 351 |
| Flexural Modulus[5] (kfg/cm²) | 16600 | 16700 | 16500 | 16800 | 13100 | 18600 | 21000 | 16500 |
| Thermal Deformation Temp.[6] (°C.) | 129.7 | 129.4 | 130.6 | 131.2 | 108.0 | 134.1 | 142.3 | 129.5 |

| | Example No. | | | | | | | |
|---|---|---|---|---|---|---|---|---|
| | 56 | 57 | 58 | 59 | 60 | 61 | 62 | 63 |
| Composition (Weight %) | | | | | | | | |
| Polyester | | | | | | | | |
| PET | — | — | 30 | — | — | — | — | — |
| PBT | 30 | 30 | — | 30 | 30 | 30 | 30 | 30 |
| Polypropylene | | | | | | | | |
| HPP1 | 60 | — | 60 | 50 | 40 | 30 | 40 | 40 |
| BPP | — | 60 | — | — | — | — | — | — |
| Modified Polypropylene | CMPP3 | CMPP1 | CMPP1 | CMPP1 | CMPP1 | CMPP1 | CMPP1 | CMPP1 |
| Amount | 10 | 10 | 10 | 10 | 10 | 10 | 10 | 10 |
| Olefinic Elastomer | — | — | — | EPR | EPR | EPR | CMEPR | EBR |
| Amount | — | — | — | 10 | 20 | 30 | 20 | 20 |
| Properties of Thermoplastic Resin Composition | | | | | | | | |
| MFR (g/10 minutes)[1] | 14.6 | 17.3 | 30.4 | 16.3 | 12.4 | 10.4 | 11.4 | 12.9 |
| Surface Peel Resistance[2] | 100/100 | 100/100 | 100/100 | 100/100 | 100/100 | 100/100 | 100/100 | 100/100 |
| Izod Impact Strength[3] (kgfcm/cm) at −30° C. | 7.3 | 7.0 | 3.4 | 5.3 | 6.1 | 7.0 | 9.3 | 5.1 |
| Tensile Strength[4] (kgf/cm²) | 326 | 312 | 354 | 300 | 259 | 239 | 234 | 283 |
| Flexural Modulus[5] (kfg/cm²) | 15800 | 15200 | 16200 | 15000 | 13300 | 9800 | 10400 | 14000 |
| Thermal Deformation Temp.[6] (°C.) | 126.0 | 120.7 | 89.4 | 111.3 | 104.6 | 82.1 | 98.3 | 110.6 |

TABLE 7

| | Comparative Example No. | | | | | | | | |
|---|---|---|---|---|---|---|---|---|---|
| | 23 | 24 | 25 | 26 | 27 | 28 | 29 | 30 | 31 |
| Composition (Weight %) | | | | | | | | | |
| Polyester | | | | | | | | | |
| PET | — | 100 | — | — | — | — | — | — | — |
| PBT | 100 | — | — | 10 | 30 | 50 | 70 | 30 | 30 |
| Polypropylene | | | | | | | | | |
| HPP1 | — | — | 100 | 90 | 70 | 50 | 30 | 60 | 60 |
| BPP | — | — | — | — | — | — | — | — | — |
| Modified Polypropylene | — | — | — | — | — | — | — | CMPP4 | CMPP5 |
| Amount | — | — | — | — | — | — | — | 10 | 10 |
| Olefinic Elastomer | — | — | — | — | — | — | — | — | — |
| Amount | — | — | — | — | — | — | — | — | — |
| Properties of Thermoplastic Resin Composition | | | | | | | | | |
| MFR (g/10 minutes)[1] | 14.6 | 38.9 | 9.0 | 22.0 | 28.1 | 32.4 | 34.7 | 29.9 | 27.3 |
| Surface Peel Resistance[2] | 100/100 | 100/100 | 100/100 | 10/100 | 0/100 | 0/100 | 0/100 | 10/100 | 0/100 |
| Izod Impact Strength[3] (kgfcm/cm) at −30° C. | 3.6 | 2.6 | 1.4 | 2.1 | 1.8 | 1.7 | 4.0 | 1.9 | 1.4 |
| Tensile Strength[4] (kgf/cm²) | 568 | 616 | 367 | 231 | 124 | 105 | 420 | 151 | 130 |
| Flexural Modulus[5] (kfg/cm²) | 22000 | 22500 | 13700 | 13600 | 16500 | 18900 | 21500 | 16400 | 16300 |
| Thermal Deformation Temp.[6] (°C.) | 147.2 | 71.8 | 105.8 | 110.0 | 129.2 | 137.6 | 145.8 | 128.6 | 129.0 |

As is clear from Table 6, the thermoplastic resin compositions of Examples 48–63 were excellent in a combination of the surface peel resistance, the Izod impact strength, the tensile strength at yield, the flexural modulus and the thermal deformation temperature.

On the other hand, as is clear from Table 7, the thermoplastic resin compositions of Comparative Examples 26–31 showed a particularly poor surface peel resistance. The thermoplastic resin compositions of Comparative Examples 24–28, 30 and 31 suffered from a poor Izod impact strength.

EXAMPLES 64–71, AND COMPARATIVE EXAMPLES 32–36

Each of various polypropylenes shown in Table 8 was dry-blended with a graft monomer and a radical generator in amounts shown in Table 8 by using a Henschel mixer, and then subjected to graft polymerization by melt-blending at a temperature of 200° C. and at 80 rpm for 5 minutes in a laboplastomill to produce a modified polypropylene.

Each of the resulting modified polypropylenes was mixed with polyethylene terephthalate (PET) or polybutylene terephthalate (PBT2) as a polyester in the presence of an acid catalyst, if necessary, in proportions shown in Table 8, and the resulting mixture was subjected to graft polymerization by melt-blending at 280° C. and at 80 rpm for 5 minutes in a laboplastomill.

Each of the resulting modified polypropylenepolyester graft copolymers was measured with respect to a graft ratio of the polyester. The results are also shown in Table 8 together with the graft ratio of the graft monomer in the modified polypropylene.

TABLE 8

| [1] Modified PP | Example No. | | | |
|---|---|---|---|---|
| | 64 | 65 | 66 | 67 |
| Composition | | | | |
| Polypropylene | HPP2 | HPP2 | HPP2 | HPP2 |
| Amount of Unconjugated Diene (mol %) | — | — | — | — |
| MFR (g/10 minutes)[1] | 1.5 | 1.5 | 1.5 | 1.5 |
| Graft Monomer | AXE | AXE | AXE | AXE |
| Amount (phr) | 5 | 5 | 5 | 5 |
| Graft Polymerization Conditions | | | | |
| Temperature (°C.) | 200 | 200 | 200 | 200 |
| Amount of POX (phr) | 0.1 | 0.1 | 0.1 | 0.1 |
| Graft Ratio (Weight %) of Graft Monomer[2] | 2.1 | 2.1 | 2.1 | 2.1 |
| [2] Modified Polypropylene-Polyester Graft Copolymer | | | | |
| Polyester | PBT2 | PBT2 | PBT2 | PBT2 |
| Weight Ratio of Modified Polypropylene/Polyester | 30/70 | 50/50 | 70/30 | 50/50 |
| Melt-Blending Conditions | | | | |
| Temperature (°C.) | 280 | 280 | 280 | 280 |
| Amount of Acid Catalyst (phr) | — | — | — | 0.1 |
| Graft Ratio (Weight %) of Polyester in Modified Polypropylene-Polyester Graft Copolymer[3] | 24.8 | 16.7 | 12.5 | 25.1 |

| [1] Modified PP | Example No. | | | |
|---|---|---|---|---|
| | 68 | 69 | 70 | 71 |
| Composition | | | | |
| Polypropylene | RPP | PPDM1 | PPDM2 | HPP2 |
| Amount of Unconjugated Diene (mol %) | — | 0.4 | 1.0 | — |
| MFR (g/10 minutes)[1] | 1.0 | 5 | 2 | 1.0 |
| Graft Monomer | AXE | AXE | AXE | AXE |
| Amount (phr) | 5 | 5 | 5 | 5 |
| Graft Polymerization Conditions | | | | |
| Temperature (°C.) | 200 | 200 | 200 | 200 |
| Amount of POX (phr) | 0.1 | 0.1 | 0.1 | 0.1 |
| Graft Ratio (Weight %) of Graft Monomer[2] | 2.3 | 2.7 | 2.6 | 2.1 |
| [2] Modified Polypropylene-Polyester Graft Copolymer | | | | |
| Polyester | PBT2 | PBT2 | PBT2 | PET |
| Weight Ratio of Modified Polypropylene/Polyester | 50/50 | 50/50 | 50/50 | 50/50 |
| Melt-Blending Conditions | | | | |
| Temperature (°C.) | 280 | 280 | 280 | 280 |
| Amount of Acid Catalyst (phr) | — | — | — | — |
| Graft Ratio (Weight %) of Polyester in Modified Polypropylene-Polyester Graft Copolymer[3] | 18.0 | 23.8 | 25.4 | 11.3 |

| [1] Modified PP | Comparative Example No. | | | | |
|---|---|---|---|---|---|
| | 32 | 33 | 34 | 35 | 36 |
| Composition | | | | | |
| Polypropylene | HPP2 | HPP2 | HPP2 | HPP2 | PPDM1 |
| Amount of Unconjugated Diene (mol %) | — | — | — | — | 0.4 |
| MFR (g/10 minutes)[1] | 1.5 | 1.5 | 1.5 | 1.5 | 5 |
| Graft Monomer | MAH | MAH | MAH | MAH | MAH |
| Amount (phr) | 1 | 1 | 1 | 5 | 5 |

TABLE 8-continued

| Graft Polymerization Conditions | | | | | |
|---|---|---|---|---|---|
| Temperature (°C.) | 200 | 200 | 200 | 200 | 200 |
| Amount of POX (phr) | 0.1 | 0.1 | 0.1 | 0.1 | 0.1 |
| Graft Ratio (Weight %) of Graft Monomer[2] | 0.3 | 0.3 | 0.3 | 0.4 | 2.0 |
| [2] Modified Polypropylene-Polyester Graft Copolymer | | | | | |
| Polyester | PBT2 | PBT2 | PBT2 | PBT2 | PBT2 |
| Weight Ratio of Modified Polypropylene/Polyester | 30/70 | 50/50 | 70/30 | 50/50 | 50/50 |
| Melt-Blending Conditions | | | | | |
| Temperature (°C.) | 280 | 280 | 280 | 280 | 280 |
| Amount of Acid Catalyst (phr) | — | — | — | — | — |
| Graft Ratio (Weight %) of Polyester in Modified Polypropylene-Polyester Graft Copolymer[3] | 4.9 | 3.9 | 6.7 | 4.3 | 8.9 |

Note:
[1]MFR: Measured accroding to JIS K 7210.
[2]Graft ratio of modifying monomer
Measured in the same manner as in Synthesis Example 1.
[(ii)]In the case of MAH
Measured in the same manner as in Synthesis Example 4.
[3]Graft ratio of polyester
The modified polypropylene-polybutylene terephthalate graft copolymer or the modified polypropylene-polyethylene terephthalate graft copolymer was pulverized to a particle size of 0.246 mm or less and extracted in m-cresol at 120° C. to remove unreacted polybutylene terephthalate or unreacted polyethylene terephthalate. The remaining sample was pressed to a film having a thickness of 50-100 μm. The IR spectrum measurement of the sample provided peaks (700, 1504, 1580 cm$^{-1}$) peculiar to polybutylene terephthalate or polyethylene terephthalate and not affected by the graft polymerization. From their percentages, the graft ratio was obtained by the following equation:

$$\text{Graft Ratio} = \frac{\text{Weight of Grafted Polyester}}{\text{Weight of Graft Copolymer}} \times 100 \, (\%)$$

As is clear from Table 8, the modified polypropylene-polyester graft copolymers of Examples 64–71 obtained by the method of the present invention had high graft ratios of the polyesters.

On the other hand, in the case of the MAH-modified polypropylene-polyester graft copolymers of Comparative Examples 32–36, they had low graft ratios of the polyesters.

EXAMPLES 72 AND 73

The modified polypropylene-polyester graft copolymers obtained in Examples 65 and 69 were further subjected to a heat treatment at 170° C. for 24 hours in an N$_2$ gas stream. With respect to each of the resulting heat-treated products, the graft ratio was measured in the same manner as in Example 64.

In Example 72, the heat-treated copolymer of Example 65 had a graft ratio of 22.3 weight %, and in Example 73, the heat-treated copolymer of Example 69 had a graft ratio of 30.7 weight %, showing an improvement of the graft ratios over the corresponding untreated copolymers.

EXAMPLES 74–82, COMPARATIVE EXAMPLES 37–39

Polypropylene (HPP1 or BPP), a modified polypropylene (CMPP1 or CMPP2), a styrene-acrylonitrile random copolymer (AS or ABS) and polycaprolactone (PCL1 or PCL2) shown in Table 9 were dry-blended in amounts shown in Table 9 by using a Henschel mixer. Each of the resulting mixture was then subjected to graft polymerization by melt-blending at a temperature of 250° C. and at 200 rpm in a double-screw extruder having a diameter of 45 mm.

Next, the resulting blends were measured with respect to a melt flow rate, a surface peel resistance, an Izod impact strength, a tensile strength, a tensile elongation at break, a flexural modulus and a thermal deformation temperature. The results are shown in Table 9.

COMPARATIVE EXAMPLE 40

60 parts by weight of polypropylene (HPP1), 30 parts by weight of a styrene-acrylonitrile random copolymer (AS) and 10 parts by weight of styrene-ethylene.butylenestyrene block copolymer (SEBS) were dry-blended by using a Henschel mixer, and then subjected to graft polymerization by melt-blending at a temperature of 250° C. and at 200 rpm in a double-screw extruder having a diameter of 45 mm.

The resulting thermoplastic resin compositions were measured with respect to a melt flow rate, a surface peel resistance, an Izod impact strength, a tensile strength, a tensile elongation at break, a flexural modulus and a thermal deformation temperature in the same manner as in Example 74. The results are shown in Table 9.

TABLE 9

| | Example No. | | | | | | | | |
|---|---|---|---|---|---|---|---|---|---|
| | 74 | 75 | 76 | 77 | 78 | 79 | 80 | 81 | 82 |
| Composition (Parts by Weight) | | | | | | | | | |
| Polypropylene | | | | | | | | | |
| HPP1 | 50 | 55 | 60 | 50 | 50 | 55 | 50 | — | 60 |
| BPP | — | — | — | — | — | — | — | 50 | — |
| Modified Polypropylene | CMPP1 | CMPP1 | CMPP1 | CMPP1 | CMPP2 | CMPP2 | CMPP2 | CMPP2 | CMPP2 |
| Amount | 10 | 5 | 10 | 20 | 10 | 5 | 10 | 10 | 10 |
| Styrene-Acrylonitrile | AS | AS | AS | AS | AS | AS | AS | AS | ABS |

TABLE 9-continued

| Random Copolymer | | | | | | | | | |
|---|---|---|---|---|---|---|---|---|---|
| Amount | 30 | 35 | 20 | 20 | 30 | 35 | 30 | 30 | 20 |
| Polycaprolactone | PCL1 | PCL1 | PCL1 | PCL1 | PCL1 | PCL1 | PCL2 | PCL1 | PCL1 |
| Amount | 10 | 5 | 10 | 10 | 10 | 5 | 10 | 10 | 10 |
| SEBS | — | — | — | — | — | — | — | — | — |
| Properties of Thermoplastic Resin Composition | | | | | | | | | |
| MFR (g/10 minutes)[1] | 8.1 | 7.9 | 9.0 | 8.3 | 8.6 | 8.5 | 11.4 | 7.9 | 7.4 |
| Surface Peel Resistance[2] | 100/100 | 97/100 | 100/100 | 100/100 | 100/100 | 98/100 | 89/100 | 100/100 | 100/100 |
| Izod Impact Strength[3] (kgfcm/cm) at −30° C. | 3.5 | 3.0 | 3.8 | 3.9 | 3.8 | 3.6 | 3.0 | 4.0 | 6.8 |
| Tensile Strength[4] (kgf/cm$^2$) | 371 | 376 | 354 | 341 | 370 | 385 | 364 | 385 | 332 |
| Tensile Elongation at Break[5] (%) | 12 | 10 | 15 | 12 | 11 | 9 | 8 | 13 | 17 |
| Flexural Modulus[6] (kfg/cm$^2$) | 18500 | 19000 | 16800 | 16500 | 19100 | 19700 | 17500 | 19300 | 12500 |
| Thermal Deformation Temp.[7] (°C.) | 101.8 | 103.5 | 102.1 | 102.3 | 104.0 | 104.1 | 100.9 | 99.8 | 100.1 |

| | Comparative Example No. | | | |
|---|---|---|---|---|
| | 37 | 38 | 39 | 40 |
| Composition (Parts by Weight) | | | | |
| Polypropylene | | | | |
| HPP1 | 60 | 50 | 60 | 60 |
| BPP | — | — | — | — |
| Modified Polypropylene | — | CMPP1 | — | — |
| Amount | — | 10 | — | — |
| Styrene-Acrylonitrile Random Copolymer | AS | AS | AS | AS |
| Amount | 40 | 40 | 30 | 30 |
| Polycaprolactone | — | — | PCL1 | — |
| Amount | — | — | 10 | — |
| SEBS | — | — | — | 10 |
| Properties of Thermoplastic Resin Composition | | | | |
| MFR (g/10 minutes)[1] | 7.9 | 9.6 | 8.9 | 8.3 |
| Surface Peel Resistance[2] | 0/100 | 0/100 | 0/100 | 0/100 |
| Izod Impact Strength[3] (kgfcm/cm) at −30° C. | 1.0 | 1.0 | 1.3 | 1.5 |
| Tensile Strength[4] (kgf/cm$^2$) | 305 | 302 | 284 | 296 |
| Tensile Elongation at Break[5] (%) | 2 | 3 | 5 | 10 |
| Flexural Modulus[6] (kfg/cm$^2$) | 21000 | 20300 | 15900 | 14600 |
| Thermal Deformation Temp.[7] (°C.) | 104.1 | 103.8 | 98.4 | 98.6 |

[1]Melt flow rate
Measured according to JIS K 6758.
[2]Surface peel resistance
Measured in the same manner as in Examples 30–47.
[3]Izod impact strength
Measured according to JIS K 7110.
[4]Tensile strength
Measured according to JIS K 7113.
[5]Tensile elongation at break
Measured according to JIS K 7113.
[6]Flexural modulus
Measured according to JIS K 7203.
[7]Thermal deformation temperature
Measured according to JIS K 7207.

As is clear from Table 9, the thermoplastic resin compositions of Examples 74–82 were excellent in a combination of the surface peel resistance, the İzod impact strength, the tensile strength, the tensile elongation at break, the flexural modulus and the thermal deformation temperature.

On the other hand, the thermoplastic resin compositions of Comparative Examples 37–39 and that of Comparative Example 40 containing a styrene-ethylene.butylene-styrene block copolymer as a compatibilizer suffered from poor surface peel resistance and Izod impact strength.

EXAMPLES 83–90, COMPARATIVE EXAMPLES 41–47

Polypropylene (HPP1) and modified polypropylenes (CMPP6-CMPP8) were dry-blended in amounts shown in Table 10 by using a Henschel mixer. Each of the resulting mixtures was then melt-blended with glass fibers (GF1 or GF2) at a temperature of 230° C. and at 250 rpm in a double-screw extruder having a diameter of 44 mm. Incidentally, Comparative Example 41 is a case where only a homopolypropylene was used.

The resulting fiber-reinforced thermoplastic resin compositions were measured with respect to a melt flow rate, a tensile strength at break, a flexural modulus, a notched Izod impact strength, a thermal deformation temperature and a yellowness index. The results are shown in Table 10.

blended in amounts shown in Table 11 by using a Henschel mixer. Each of the resulting mixtures was

TABLE 10

|  | Example No. | | | | | | | |
|---|---|---|---|---|---|---|---|---|
|  | 83 | 84 | 85 | 86 | 87 | 88 | 89 | 90 |
| Composition (Parts by Weight) | | | | | | | | |
| Polypropylene HPP1 | 95 | 90 | 80 | 70 | 90 | 90 | 90 | 90 |
| Modified Polypropylene | CMPP6 | CMPP6 | CMPP6 | CMPP6 | CMPP6 | CMPP6 | CMPP7 | CMPP6 |
| Amount | 5 | 10 | 20 | 30 | 10 | 10 | 10 | 10 |
| Glass Fiber | GF1 | GF1 | GF1 | GF1 | GF1 | GF1 | GF1 | GF2 |
| Amount | 20 | 20 | 20 | 20 | 10 | 30 | 20 | 20 |
| Properties of Thermoplastic Resin Composition | | | | | | | | |
| MFR (g/10 minutes)[1] | 14.5 | 17.0 | 19.4 | 20.5 | 12.4 | 21.6 | 11.0 | 16.4 |
| Tensile Strength at Break[2] (kgf/cm$^2$) | 790 | 920 | 936 | 931 | 760 | 1230 | 924 | 918 |
| Flexural Modulus[3] (kgf/cm$^2$) | 40200 | 41900 | 43100 | 42800 | 32000 | 48100 | 42100 | 42100 |
| Notched Izod Impact Strength[4] (kgfcm/cm) at 23° C. | 5.9 | 6.5 | 7.2 | 7.0 | 6.3 | 8.0 | 7.5 | 6.4 |
| Thermal Deformation Temp.[5] (°C.) | 161 | 162 | 162 | 162 | 156 | 163 | 160 | 161 |
| Yellowness Index[6] | 3.5 | 8.5 | 10.4 | 15.3 | 4.5 | 12.1 | 8.9 | 3.0 |

|  | Comparative Example No. | | | | | | |
|---|---|---|---|---|---|---|---|
|  | 41 | 42 | 43 | 44 | 45 | 46 | 47 |
| Composition (Parts by Weight) | | | | | | | |
| Polypropylene HPP1 | 100 | 100 | 100 | 100 | 90 | 80 | 70 |
| Modified Polypropylene | — | — | — | — | CMPP8 | CMPP8 | CMPP8 |
| Amount | — | — | — | — | 10 | 20 | 30 |
| Glass Fiber | — | GF1 | GF1 | GF1 | GF1 | GF1 | GF1 |
| Amount | — | 10 | 20 | 30 | 20 | 20 | 20 |
| Properties of Thermoplastic Resin Composition | | | | | | | |
| MFR (g/10 minutes)[1] | 9.0 | 9.5 | 10.8 | 17.3 | 18.2 | 20.6 | 29.3 |
| Tensile Strength at Break[2] (kgf/cm$^2$) | 285 | 385 | 411 | 490 | 903 | 924 | 915 |
| Flexural Modulus[3] (kgf/cm$^2$) | 15200 | 23400 | 36100 | 42400 | 39600 | 40100 | 41200 |
| Notched Izod Impact Strength[4] (kgfcm/cm) at 23° C. | 2.7 | 3.4 | 3.7 | 4.0 | 6.4 | 6.8 | 5.4 |
| Thermal Deformation Temp.[5] (°C.) | 105 | 132 | 146 | 159 | 160 | 161 | 161 |
| Yellowness Index[6] | 3.0 | 24 | 33 | 45 | 41 | 51 | 59 |

[1]Melt flow rate Measured according to JIS K 6756, at 230° C. under a 2.16 kg load.
[2]Tensile strength at break Measured according to JIS K 7113.
[3]Flexural modulus Measured according to JIS K 7203.
[4]Notched Izod impact strength Measured according to JIS K 7110 at 23° C.
[5]Thermal deformation temperature Measured according to JIS K 7207.
[6]Yellowness index Measured according to ASTM 1925.

As is clear from Table 10, the fiber-reinforced polypropylene compositions of Examples 83–90 are superior to that of Comparative Example 41 in which only polypropylene was used, and those of Comparative Examples 42–44 which contained no modified polypropylene, in the tensile strength at break, the notched Izod impact strength and the thermal deformation temperature. Also, they showed an extremely lower yellow index than those of Comparative Examples 45–47 containing the maleic anhydride-modified polypropylene.

EXAMPLES 91–96, COMPARATIVE EXAMPLES 48–52

Polypropylene (HPP1) and various monomers (AXE, MAH, GMA) shown in Table 11 were dry-blended in amounts shown in Table 11 by using a Henschel mixer. Each of the resulting mixtures was then melt-blended with glass fibers (GF1) at a temperature of 230° C. and at 200 rpm in a double-screw extruder having a diameter of 45 mm. Incidentally, Comparative Example 48 is a case where only a homopolypropylene was used.

The resulting fiber-reinforced thermoplastic resin compositions were measured with respect to a melt flow rate, a tensile strength at break, a flexural modulus, a notched Izod impact strength, a thermal deformation temperature and a yellowness index. The results are shown in Table 11.

TABLE 11

|  | Example No. | | | | | | | Comparative Example No. | | | | |
|---|---|---|---|---|---|---|---|---|---|---|---|---|
|  | 91 | 92 | 93 | 94 | 95 | 96 | 97 | 48 | 49 | 50 | 51 | 52 |
| Composition (Parts by Weight) | | | | | | | | | | | | |
| Polypropylene HPP1 | 100 | 100 | 100 | 100 | 100 | 100 | 100 | 100 | 100 | 100 | 100 | 100 |
| Graft Monomer | AXE | AXE | AXE | AXE | AXE | AXE | AXE | — | — | — | MAH | GMA |
| Amount | 1 | 1 | 1 | 1 | 1 | 0.5 | 2 | — | — | — | 1 | 1 |
| Glass Fiber | GF1 | GF1 | GF1 | GF1 | GF1 | GF1 | GF1 | — | GF1 | GF1 | GF1 | GF1 |
| Amount | 10 | 20 | 30 | 20 | 20 | 20 | 20 | — | 20 | 20 | 20 | 20 |

TABLE 11-continued

|  | Example No. | | | | | | | Comparative Example No. | | | | |
| --- | --- | --- | --- | --- | --- | --- | --- | --- | --- | --- | --- | --- |
|  | 91 | 92 | 93 | 94 | 95 | 96 | 97 | 48 | 49 | 50 | 51 | 52 |
| POX | 0.05 | 0.05 | 0.05 | — | 0.1 | 0.05 | 0.05 | — | — | 0.05 | 0.05 | 0.05 |
| Properties of Thermoplastic Resin Composition | | | | | | | | | | | | |
| MFR (g/10 minutes)[1] | 16.3 | 24.3 | 31.6 | 12.5 | 21.3 | 14.3 | 15.4 | 9.0 | 10.8 | 25.6 | 34.5 | 25.9 |
| Tensile Strength at Break[2] (kgf/cm$^2$) | 751 | 895 | 915 | 742 | 720 | 709 | 784 | 285 | 411 | 401 | 385 | 374 |
| Flexural Modulus[3] (kgf/cm$^2$) | 30400 | 41000 | 47400 | 30100 | 31500 | 29900 | 32100 | 15200 | 36100 | 37200 | 35000 | 34500 |
| Notched Izod Impact Strength[4] (kgfcm/cm) at 23° C. | 6.0 | 6.3 | 7.7 | 5.8 | 5.9 | 5.8 | 6.5 | 2.7 | 3.7 | 2.9 | 2.8 | 2.7 |
| Thermal Deformation Temp.[5] (°C.) | 154 | 159 | 161 | 152 | 157 | 152 | 159 | 105 | 146 | 143 | 142 | 141 |
| Yellowness Index[6] | 3.9 | 5.9 | 9.9 | 3.0 | 5.9 | 2.4 | 4.4 | 3.0 | 33 | 40 | 51 | 45 |

[1] Melt flow rate Measured according to JIS K 6756, at 230° C. under a 2.16 kg load.
[2] Tensile strength at break Measured according to JIS K 7113.
[3] Flexural modulus Measured according to JIS K 7203.
[4] Notched Izod impact strength Measured according to JIS K 7110 at 23° C.
[5] Thermal deformation temperature Measured according to JIS K 7207.
[6] Yellowness index Measured according to ASTM 1925.

As is clear from Table 11, the fiber-reinforced polypropylene compositions of Examples 91–97 are superior to that of Comparative Example 48 in which only polypropylene was used, and those of Comparative Examples 49 and 50 which contained no modified polypropylene, in the tensile strength at break, the notched Izod impact strength and the thermal deformation temperature. Also, they showed an extremely lower yellow index than those of Comparative Examples 51 and 52 using maleic anhydride or glycidyl methacrylate instead of the glycidyl compound used in Examples.

EXAMPLES 98–106, COMPARATIVE EXAMPLES 53–57

Homopolypropylene (HPP1) or a propylene-ethylene block copolymer (BPP) and a modified polypropylene (CMPP6-CMPP8) shown in Table 12 were dry-blended in amounts shown in Table 12 by using a Henschel mixer. Each of the resulting mixtures was then melt-blended with talc at a temperature of 230° C. and at 250 rpm in a double-screw extruder having a diameter of 44 mm. Incidentally, Comparative Example 53 is a case where only a homopolypropylene (HPP1) was used.

The resulting talc-reinforced thermoplastic resin compositions were measured with respect to a flexural modulus, a tensile strength, a notched Izod impact strength and a thermal deformation temperature. The results are shown in Table 12.

EXAMPLES 107, 108, COMPARATIVE EXAMPLES 58, 59

Polyethylene (HDPE) and a modified polyethylene (CMPE) were dry-blended in amounts shown in Table 13 by using a Henschel mixer. Each of the resulting mixtures was then melt-blended with talc at a temperature of 230° C. and at 250 rpm in a double-screw extruder having a diameter of 44 mm.

The resulting talc-reinforced thermoplastic resin compositions were measured with respect to an Olsen rigidity, a tensile strength, a notched Izod impact strength and a Vicat softening point. The results are shown in Table 13.

TABLE 12

|  | Example No. | | | | | | | |
| --- | --- | --- | --- | --- | --- | --- | --- | --- |
|  | 98 | 99 | 100 | 101 | 102 | 103 | 104 | 105 |
| Composition (Parts by Weight) | | | | | | | | |
| Polypropylene | | | | | | | | |
| HPP1 | 80 | 70 | 60 | 50 | 60 | 50 | 40 | 70 |
| BPP | — | — | — | — | — | — | — | — |
| Modified Polypropylene | CMPP6 | CMPP6 | CMPP6 | CMPP6 | CMPP6 | CMPP6 | CMPP6 | CMPP7 |
| Amount | 10 | 10 | 10 | 10 | 20 | 30 | 40 | 10 |
| Talc | 10 | 20 | 30 | 40 | 20 | 20 | 20 | 20 |
| Properties of Thermoplastic Resin Composition | | | | | | | | |
| Flexural Modulus[1] (kgf/cm$^2$) | 22300 | 27000 | 32400 | 37000 | 28100 | 28400 | 28200 | 26400 |
| Tensile Strength at Break[2] (kgf/cm$^2$) | 389 | 394 | 391 | 394 | 398 | 395 | 388 | 405 |
| Notched Izod Impact Strength[3] (kgfcm/cm) at 23° C. | 3.8 | 3.5 | 3.0 | 3.0 | 3.7 | 3.9 | 3.2 | 4.1 |
| Thermal Deformation Temp.[4] (°C.) | 80 | 83 | 89 | 94 | 85 | 87 | 83 | 82 |

|  | Example No. | Comparative Example No. | | | | |
| --- | --- | --- | --- | --- | --- | --- |
|  | 106 | 53 | 54 | 55 | 56 | 57 |
| Composition (Parts by Weight) | | | | | | |
| Polypropylene | | | | | | |
| HPP1 | — | 100 | 90 | 80 | 70 | 70 |
| BPP | 70 | — | — | — | — | — |

TABLE 12-continued

|  |  |  |  |  |  |
|---|---|---|---|---|---|---|
| Modified Polypropylene | CMPP6 | — | — | — | — | CMPP8 |
| Amount | 10 | — | — | — | — | 10 |
| Talc | 20 | — | 10 | 20 | 30 | 20 |
| Properties of Thermoplastic Resin Composition | | | | | | |
| Flexural Modulus[1] (kgf/cm²) | 20100 | 15200 | 19800 | 24300 | 28200 | 25100 |
| Tensile Strength at Break[2] (kgf/cm²) | 302 | 372 | 368 | 365 | 360 | 358 |
| Notched Izod Impact Strength[3] (kgfcm/cm) at 23° C. | 5.3 | 3.6 | 3.4 | 3.0 | 2.5 | 3.2 |
| Thermal Deformation Temp.[4] (°C.) | 75 | 73 | 75 | 76 | 81 | 76 |

TABLE 13

| Composition (Parts by Weight) | Example No. 107 | Example No. 108 | Comparative Example No. 58 | Comparative Example No. 59 |
|---|---|---|---|---|
| Polyethylene HDPE | 70 | 60 | 100 | 80 |
| Modified Polyethylene | CMPE | CMPE | — | — |
| Amount | 10 | 20 | — | — |
| Talc | 20 | 20 | — | 20 |
| Properties of Thermoplastic Resin Composition | | | | |
| Olsen Rigidity[5] (kgf/cm²) | 19300 | 19500 | 12500 | 18100 |
| Tensile Strength[2] (kgf/cm²) | 378 | 396 | 345 | 336 |
| Notched Izod Impact Strength[3] (kgfcm/cm) at 23° C. | 6.5 | 7.2 | 9.0 | 4.3 |
| Vicat Softening Point[6] (°C.) | 129 | 129 | 128 | 129 |

[1] Flexural modulus Measured according to JIS K 7203.
[2] Tensile strength Measured according to JIS K 7113.
[3] Notched Izod impact strength Measured according to JIS K 7110 at 23° C.
[4] Thermal deformation temperature Measured according to JIS K 7207 under a load of 18.6 kg.
[5] Olsen rigidity Measured according to JIS K 7203.
[6] Vicat softening point Measured according to JIS K 706 under a load of 18.6 kg.

As is clear from Tables 12 and 13, the talc-reinforced polypropylene compositions of Examples 98-106 are superior to those of Comparative Examples 53-57 in the flexural modulus, the tensile strength, the notched Izod impact strength and the thermal deformation temperature. The talc-reinforced polyethylene compositions of Examples 107 and 108 are superior to those of Comparative Examples 58 and 59 in the Olsen rigidity, the tensile strength and the Izod impact strength.

EXAMPLES 109-117, COMPARATIVE EXAMPLES 60-64

Homopolypropylene (HPP1) or a propylene-ethylene block copolymer (BPP) and a modified polypropylene (CMPP6, CMPP7 or CMPP8) were dry-blended in amounts shown in Table 14 by using a Henschel mixer. Each of the resulting mixtures was then melt-blended with mica at a temperature of 230° C. and at 250 rpm in a double-screw extruder having a diameter of 44 mm. Incidentally, Comparative Example 60 is a case where only a homopolypropylene (HPP1) was used.

The resulting mica-reinforced thermoplastic resin compositions were measured with respect to a flexural modulus, a tensile strength, a notched Izod impact strength and a thermal deformation temperature. The results are shown in Table 14.

EXAMPLES 118, 119, COMPARATIVE EXAMPLES 65, 66

Polyethylene (HDPE) and a modified polyethylene (CMPE) were dry-blended in amounts shown in Table 15 by using a Henschel mixer. Each of the resulting mixtures was then melt-blended with mica at a temperature of 230° C. and at 250 rpm in a double-screw extruder having a diameter of 44 mm.

The resulting mica-reinforced thermoplastic resin compositions were measured with respect to an Olsen rigidity, a tensile strength, a notched Izod impact strength and a Vicat softening point. The results are shown in Table 15.

TABLE 14

|  | Example No. | | | | | | |
|---|---|---|---|---|---|---|---|
|  | 109 | 110 | 111 | 112 | 113 | 114 | 115 |
| Composition (Parts by Weight) | | | | | | | |
| Polypropylene HPP1 | — | — | — | — | — | — | — |
| BPP | 80 | 70 | 60 | 50 | 60 | 50 | 40 |
| Modified Polypropylene | CMPP6 | CMPP6 | CMPP6 | CMPP6 | CMPP6 | CMPP6 | CMPP6 |
| Amount | 10 | 10 | 10 | 10 | 20 | 30 | 40 |
| Mica | 10 | 20 | 30 | 40 | 20 | 20 | 20 |
| Properties of Thermoplastic Resin Composition | | | | | | | |
| Flexural Modulus[1] (kgf/cm²) | 23100 | 33400 | 45100 | 48900 | 34200 | 34900 | 34800 |
| Tensile Strength[2] (kgf/cm²) | 337 | 363 | 383 | 394 | 376 | 380 | 372 |
| Notched Izod Impact Strength[3] (kgfcm/cm) at 23° C. | 5.9 | 3.9 | 3.4 | 3.0 | 4.0 | 4.0 | 3.8 |
| Thermal Deformation Temp.[4] (°C.) | 75 | 88 | 109 | 115 | 89 | 88 | 88 |

|  | Example No. | | Comparative Example No. | | | | |
|---|---|---|---|---|---|---|---|
|  | 116 | 117 | 60 | 61 | 62 | 63 | 64 |
| Composition (Parts by Weight) | | | | | | | |

TABLE 14-continued

|  | | | | | | | |
|---|---|---|---|---|---|---|---|
| Polypropylene HPP1 | — | 70 | — | — | — | — | — |
| BPP | 70 | — | 100 | 90 | 80 | 70 | 70 |
| Modified Polypropylene | CMPP7 | CMPP6 | — | — | — | — | CMPP8 |
| Amount | 10 | 10 | — | — | — | — | 10 |
| Mica | 20 | 20 | — | 10 | 20 | 30 | 20 |
| Properties of Thermoplastic Resin Composition | | | | | | | |
| Flexural Modulus[1] (kgf/cm$^2$) | 30900 | 35600 | 12900 | 20100 | 29300 | 41500 | 20900 |
| Tensile Strength[2] (kgf/cm$^2$) | 342 | 412 | 282 | 305 | 341 | 365 | 310 |
| Notched Izod Impact Strength[3] (kgfcm/cm) at 23° C. | 4.6 | 2.9 | 6.8 | 4.8 | 2.6 | 2.4 | 3.3 |
| Thermal Deformation Temp.[4] (°C.) | 87 | 96 | 60 | 69 | 80 | 99 | 71 |

TABLE 15

|  | Example No. | | Comparative Example No. | |
|---|---|---|---|---|
|  | 118 | 119 | 65 | 66 |
| Composition (Parts by Weight) | | | | |
| Polyethylene HDPE | 70 | 60 | 100 | 80 |
| Modified Polyethylene | CMPE | CMPE | — | — |
| Amount | 10 | 20 | — | — |
| Mica | 20 | 20 | — | 20 |
| Properties of Thermoplastic Resin Composition | | | | |
| Olsen Rigidity[5] (kgf/cm$^2$) | 29800 | 30000 | 12500 | 26300 |
| Tensile Strength[2] (kgf/cm$^2$) | 383 | 396 | 345 | 360 |
| Notched Izod Impact Strength[3] (kgfcm/cm) at 23° C. | 5.8 | 6.4 | 9.0 | 2.8 |
| Vicat Softening Point[6] (°C.) | 130 | 130 | 128 | 129 |

[1]Flexural modulus Measured according to JIS K 7203.
[2]Tensile strength Measured according to JIS K 7113.
[3]Notched Izod impact strength Measured according to JIS K 7110 at 23° C.
[4]Thermal deformation temperature Measured according to JIS K 7207 under a load of 18.6 kg.
[5]Olsen rigidity Measured according to JIS K 7203.
[6]Vicat softening point Measured according to JIS K 706 under a load of 18.6 kg.

As is clear from Tables 14 and 15, the mica-reinforced polypropylene compositions of Examples 109-117 are superior to those of Comparative Examples 60-64 in the flexural modulus, the tensile strength, the notched Izod impact strength and the thermal deformation temperature. The mica-reinforced polyethylene compositions of Examples 118 and 119 are superior to those of Comparative Examples 65 and 66 in the Olsen rigidity, the tensile strength and the Izod impact strength.

As described above in detail, since the thermoplastic resin compositions of the present invention comprise an olefinic elastomer grafted with a particular glycidyl compound containing an acrylamide group and an epoxy group, and a matrix polymer resin, it shows remarkably improved impact resistance, surface peel resistance, tensile properties, etc. while retaining excellent properties such as heat resistance, chemical resistance, workability, mechanical strength, etc. inherent in the matrix polymer resin.

Further, when fillers such as glass fibers, talc and mica are added, the thermoplastic resin compositions of the present invention are provided with improved mechanical properties, heat resistance and discoloration resistance.

Such thermoplastic resin compositions of the present invention are highly useful as various engineering plastics, particularly for automobile parts, parts for home electric appliances, industrial parts, wrappings, etc.

What is claimed is:

1. A thermoplastic resin composition comprising:
(a) 2-70 weight % of a modified olefinic elastomer produced by graft-polymerizing:
 (i) 100 parts by weight of an olefinic elastomer comprising 5-95 weight % of ethylene and 95-5 weight % of an α-olefin other than ethylene; with
 (ii) 0.01-30 parts by weight of a glycidyl compound represented by the following general formula:

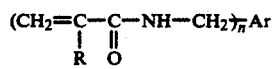

$$(CH_2=C-C-NH-CH_2)_n Ar$$
$$\phantom{(CH_2=)}R\phantom{-}O$$

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(b) 30-98 weight % of a polyamide resin.

2. A thermoplastic resin composition comprising:
(a) 2-70 weight % of a modified olefinic elastomer produced by graft-polymerizing:
 (i) 100 parts by weight of an olefinic elastomer comprising 5-95 weight % of ethylene and 95-5 weight % of an α-olefin other than ethylene; with
 (ii) 0.01-30 parts by weight of a glycidyl compound represented by the following general formula:

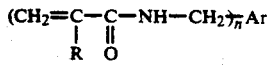

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and (b) 30-98 weight % of a polyester.

3. The thermoplastic resin composition according to claim 2, wherein said polyester is polyethylene terephthalate or polybutylene terephthalate.

4. A thermoplastic resin composition comprising:
(a) 2-70 weight % of a modified olefinic elastomer produced by graft-polymerizing:
(i) 100 parts by weight of an olefinic elastomer comprising 5-95 weight % of ethylene and 95-5 weight % of an α-olefin other than ethylene; with
(ii) 0.01-30 parts by weight of a glycidyl compound represented by the following general formula:

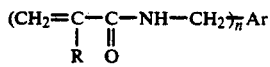

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and (b) 30-98 weight % of a polycarbonate.

5. A thermoplastic resin composition comprising:
(a) 5-95 weight % of a modified polypropylene produced by graft-polymerizing:
(i) 100 parts by weight of polypropylene; with
(ii) 0.01-30 parts by weight of a glycidyl compound represented by the following general formula:

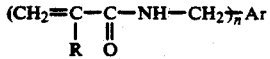

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and (b) 95-5 weight % of a polyamide resin.

6. The thermoplastic resin composition according to claim 5, wherein said thermoplastic resin composition contains 70 parts by weight or less of an olefinic elastomer, per 100 parts by weight of the total amount of said (a)+said (b).

7. A thermoplastic resin composition comprising:
(a) polypropylene;
(b) a modified polypropylene produced by graft-polymerizing:
(i) 100 parts by weight of polypropylene; with
(ii) 0.01-30 parts by weight of a glycidyl compound represented by the following general formula:

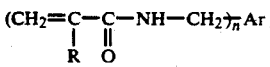

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(c) a polyamide resin,
the amount of said (b) being 5 weight % or more based on the total amount of said (a)+said (b); and the total amount of said (a)+said (b) being 5-95 weight % based on the total amount of said (a)+said (b)+said (c).

8. The thermoplastic resin composition according to claim 7, wherein said thermoplastic resin composition contains 70 parts by weight or less of an olefinic elastomer, per 100 parts by weight of the total amount of said (a)+said (b)+said (c).

9. A thermoplastic resin composition comprising:
(a) 5-95 weight % of a modified polypropylene produced by graft-polymerizing:
(i) 100 parts by weight of polypropylene; with
(ii) 0.01-30 parts by weight of a glycidyl compound represented by the following general formula:

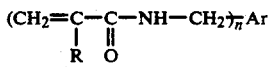

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and (b) 95-5 weight % of a polyester.

10. The thermoplastic resin composition according to claim 9, wherein said thermoplastic resin composition contains 70 parts by weight or less of an olefinic elastomer, per 100 parts by weight of the total amount of said (a)+said (b).

11. A thermoplastic resin composition comprising:
(a) polypropylene;
(b) a modified polypropylene produced by graft-polymerizing:
(i) 100 parts by weight of polypropylene; with
(ii) 0.01-30 parts by weight of a glycidyl compound represented by the following general formula:

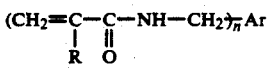

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(c) a polyester,
the amount of said (b) being 5 weight % or more based on the total amount of of said (a)+said (b); and the total amount of said (a)+said (b) being 5-95 weight % based on the total amount of said (a)+said (b)+said (c).

12. The thermoplastic resin composition according to claim 11, wherein said thermoplastic resin composition contains 70 parts by weight or less of an olefinic elastomer, per 100 parts by weight of said (a)+said (b)+said (c).

13. A method of producing a modified polypropylene-polyester graft copolymer comprising the step of melt-blending:

(a) 90-10 parts by weight of a modified polypropylene produced by graft-polymerizing polypropylene with 0.01-20 weight % of a glycidyl compound represented by the following general formula:

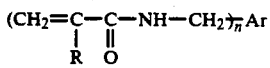

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; with (b) 10-90 parts by weight of a polyester.

14. The method of producing a modified polypropylene-polyester graft copolymer according to claim 13, wherein said modified polypropylene has a copolymer skeleton consisting essentially of propylene and an unconjugated diene comonomer represented by the following general formula:

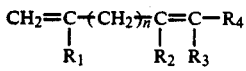

wherein each of $R_1$-$R_4$ is a hydrogen atom or an alkyl group having 1-6 carbon atoms, and n is an integer of 1-20.

15. The method of producing a modified polypropylene-polyester graft copolymer according to claim 13, further comprising the step of subjecting the melt-blended product to a heat treatment at a temperature which is lower than the melting point of said polyester by 50°-150° C. for 1-100 hours in an inert gas atmosphere.

16. The method of producing a modified polypropylene-polyester graft copolymer according to claim 13, wherein said melt-blending step is conducted in the presence of 0.01-5 parts by weight of an acid catalyst per 100 parts by weight of the total amount of said modified polypropylene and said polyester.

17. The method of producing a modified polypropylene-polyester graft copolymer according to claim 13, wherein said polyester has an intrinsic viscosity [η] of 0.30-1.8 and an end carboxyl group content of 10-200 milliequivalent/kg.

18. A thermoplastic resin composition comprising:
[A] 100 parts by weight of a mixture of:
(a) 5-95 weight % of a modified polypropylene mix comprising:
(1) 5 weight % or more of a modified polypropylene produced by graft-polymerizing:
(i) 100 parts by weight of polypropylene; with
(ii) 0.01-30 parts by weight of a glycidyl compound represented by the following general formula:

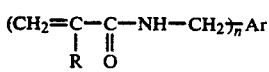

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and (2) a remaining amount of polypropylene; and
(b) 95-5 weight % of a styrene-acrylonitrile copolymer; and
[B] 2-100 parts by weight of polycaprolactone.

19. The thermoplastic resin composition according to claim 18, wherein said styrene-acrylonitrile copolymer has a weight-average molecular weight (Mw) of 10,000-1,000,000 and an acrylonitrile content of 2-50 weight %.

20. A thermoplastic resin composition comprising:
[A] 100 parts by weight of a modified polypropylene mix comprising:
(1) 2 weight % or more of a modified polypropylene produced by graft-polymerizing:
(i) 100 parts by weight of polypropylene; with
(ii) 0.01-30 parts by weight of a glycidyl compound represented by the following general formula:

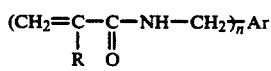

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and (2) a remaining amount of polypropylene; and
[B] 5-70 parts by weight of glass fibers.

21. The thermoplastic resin composition according to claim 20, wherein the content of said glycidyl compound is 0.01 weight % or more based on said modified polypropylene mix.

22. A method of producing a fiber-reinforced thermoplastic resin composition comprising the step of melt-blending:
(a) 100 parts by weight of polypropylene;
(b) 0.1-15 parts by weight of a glycidyl compound represented by the following general formula:

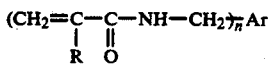

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(c) 5-70 parts by weight of glass fibers, thereby causing the modification of said polypropylene with said glycidyl group.

23. The method according to claim 22, wherein 0.01-5 parts by weight of a radical polymerization catalyst is used per 100 parts by weight of said polypropylene.

24. The method according to claim 22, wherein the melt-blending is carried out at a temperature of 170°-300° C.

25. A thermoplastic resin composition comprising:
[A] 50-98 weight % of a modified polyolefin mix comprising:
(1) 2 weight % or more of a modified polyolefin produced by graft-polymerizing:
(i) 100 parts by weight of a polyolefin; with (ii) 0.01-30 parts by weight of a glycidyl compound represented by the following general formula:

$$(CH_2=\underset{R}{C}-\underset{O}{\overset{\|}{C}}-NH-CH_2)_n Ar$$

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(2) a remaining amount of polyolefin; and
[B] 2-50 weight % of talc.

26. The thermoplastic resin composition according to claim 25, wherein the content of said glycidyl compound is 0.01 weight % or more based on said modified polyolefin mix.

27. A thermoplastic resin composition comprising:
[A] 50-98 weight % of a modified polyolefin mix comprising:
(1) 2 weight % or more of a modified polyolefin produced by graft-polymerizing:
(i) 100 parts by weight of a polyolefin; with
(ii) 0.01-30 parts by weight of a glycidyl compound represented by the following general formula:

$$(CH_2=\underset{R}{C}-\underset{O}{\overset{\|}{C}}-NH-CH_2)_n Ar$$

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; and
(2) a remaining amount of polyolefin; and
[B] 2-50 weight % of mica.

28. The thermoplastic resin composition according to claim 27, wherein the content of said glycidyl compound is 0.01 weight % or more based on said modified polyolefin mix.

* * * * *